United States Patent

Benning et al.

[11] Patent Number: 5,816,122
[45] Date of Patent: Oct. 6, 1998

[54] APPARATUS AND METHOD FOR ADAPTIVE SUPPRESSION OF VIBRATIONS IN MECHANICAL SYSTEMS

[75] Inventors: Roger David Benning, Long Valley; Douglas Roy Browning, Randolph; George Gustave Zipfel, Jr., Summit, all of N.J.

[73] Assignee: General Dynamics Advanced Technology Systems, Inc., McLeansville, N.C.

[21] Appl. No.: 640,396

[22] Filed: Apr. 30, 1996

[51] Int. Cl.$^6$ .................................................. B23B 7/00
[52] U.S. Cl. ................................ 82/1.11; 82/118; 408/11
[58] Field of Search   82/1.11, 118; 364/474.15–474.18; 408/143, 8, 11, 13

[56] References Cited

U.S. PATENT DOCUMENTS

| | | | |
|---|---|---|---|
| 3,967,515 | 7/1976 | Nachtigal | 82/2 B |
| 4,441,103 | 4/1984 | Urabe | 364/474.17 |
| 4,514,123 | 4/1985 | Johnstone et al. | 409/231 |
| 4,527,661 | 7/1985 | Johnstone et al. | 184/6.1 |
| 4,980,625 | 12/1990 | Shimada | 318/568.1 |
| 4,995,019 | 2/1991 | Begin | 368/117 |
| 5,170,103 | 12/1992 | Rouch et al. . | |
| 5,170,358 | 12/1992 | Delio | 364/474.19 |
| 5,638,304 | 6/1997 | Billoud | 364/572 |

OTHER PUBLICATIONS

Reduction of Machine Tool Vibration, M. M. Sadel and S. A. Tobia, Department of Machanical Engineering, University of Birmingham, England, pp. 128–172.

Optimal Control of Chatter in Turning, M. Shiraishi, K. Yamanaka, and H. Fujita, Int. J. Mach. Tools Manufact., vol. 31, No. 1, pp. 31–43, 1991.

A Theoretical Basis for the Active Control of a Boring Bar Operation, R. G. Klein and C. L. Nachtigal, Transactions of the ASME, Jun. 1975, pp. 172–183.

Adaptive Signal Processing, B. Widrow and S. D. Stearns, Prentice Hall, Inc., pp. 304, 344, and 350.

Optimal Estimation, F. L. Lewis, John Wiley & Sons, pp. 328–329.

U.S. Patent Application Serial Number 08/398,272, filed Mar. 3, 1995, Method And Apparatus For Reducing Residual Far–End Echo In Voice Communication Networks, Velardo–Wynn 1–4.

*Primary Examiner*—Steven C. Bishop
*Assistant Examiner*—Mark Williams
*Attorney, Agent, or Firm*—Jenner & Block

[57] ABSTRACT

A method and apparatus are provided for stabilizing at least one element of a mechanical system against echo-like responses to mechanical disturbances. One or more error signals are provided by sensing the motion of the system at one or more points. At least one adaptive filter is operated in response to the error signal or signals, and in response to at least one non-advanced reference signal that is directly related to some motion of the system. The adaptive filter produces a corrective signal for driving a mechanical actuator, thereby to apply to the element a stabilizing generalized force. By non-advanced is meant that there is a zero or negative time-delay between the presence of a given signal at the reference-sensing location and the arrival of the same, or a similar, signal at the error-sensing location. In particular embodiments of the invention, the reference-sensing location is the same as the error-sensing location.

36 Claims, 14 Drawing Sheets

APPARATUS AND METHOD FOR ADAPTIVE SUPPRESSION OF VIBRATIONS IN MECHANICAL SYSTEMS

GOVERNMENT CONTRACT

This invention was made with Government support under Contract F33615-94-C-2033 awarded by the United States Air Force. The government has certain rights in this invention.

FIELD OF THE INVENTION

This invention relates to active control techniques for suppressing vibrations in mechanical systems. Specific embodiments of the invention relate to the suppression of toolpiece vibrations during the machining of rotating workpieces.

ART BACKGROUND

Unwanted mechanical vibrations have for many years plagued designers of mechanical systems that include moving parts, or that are, in use, liable to be mechanically coupled to sources of vibrational noise. Such systems include, notably, machines for cutting rotating metal workpieces. Such systems further include other machines for the subtractive shaping of workpieces, as well as optical instruments and their support frames, lithographic and other manufacturing tools and their support frames, imaging systems of various kinds and their support frames, and self-propelled vehicles.

In metal-cutting operations, for example, the quality of the surface finish that can be achieved on a rotatable workpiece is often limited by the propensity of the cutting tool to exhibit chatter, or some other vibrational instability. This problem is especially severe in boring operations, which require the cutting tool to be mounted at the end of a relatively long, cantilever-supported bar. Because structures of this kind are rich in troublesome mechanical resonances, chatter has proven to be an important limitation for the surface finishes achievable within machined articles having cylindrical bores such as engines and projectile launchers.

Real-time signal processing has been applied to the problem of unwanted vibrations in mechanical systems. Typically, motion sensors are used to generate signals that contain information about the unwanted vibrations. These signals are transmitted to digital signal processors, which use the transmitted information to generate corrective signals for driving electromechanical actuators. These actuators, in turn, produce responses in the mechanical system that tend to oppose the unwanted vibrations.

Modem Control Theory is one well-known technique that is applied in the course of digital signal processing in order to generate corrective signals for active vibration control. Very briefly, Modern Control Theory (MCT) involves generating corrective actuator drive signals from linear combinations of the sensor signals, scaled in magnitude by fixed real-valued coefficients. Thus, the corrective drive signals are nearly instantaneous representations of the state of the error-sensor output. This leads to a wideband feedback-control system. Stated briefly, MCT is a multi-dimensional extension of single-sensor, single-actuator feedback control.

For example, MCT is applied in an active control device for machine-tool elements described in U.S. Pat. No. 5,170, 103, which issued on Dec. 8, 1992 to K. E. Rouch et al. (hereinafter, the "Rouch patent"). This device includes a sensor for producing, respectively, boring-bar displacement and velocity signals, a reaction mass mounted near the free end of the boring bar, a sensor for producing, respectively, reaction-mass displacement and velocity signals, and an actuator for displacing the reaction mass in such a manner as to counteract the undesirable vibrations of the boring bar. In a signal processor, the two velocity signals and the two displacement signals are scaled and combined according to methods of MCI to generate a corrective signal.

Through various applications of Modern Control Theory, practitioners in the art have achieved significant advances in the suppression of unwanted vibrations. However, there remain certain sources of vibration in, e.g., machining operations that have hitherto not been entirely suppressed by these methods.

SUMMARY OF THE INVENTION

In a broad aspect, the invention involves a method and apparatus for stabilizing at least one element of a mechanical system against echo-like responses to mechanical disturbances. One or more error signals are provided by sensing the motion of the system at one or more points. At least one adaptive filter is operated in response to the error signal or signals, and in response to at least one non-advanced reference signal that is directly related to some motion of the system. The adaptive filter produces a corrective signal for driving a mechanical actuator, thereby to apply to the element a stabilizing generalized force. By non-advanced is meant that there is a zero or negative time-delay between the presence of a given signal at the reference-sensing location and the arrival of the same, or a similar, signal at the error-sensing location. In particular embodiments of the invention, the reference-sensing location is the same as the error-sensing location.

DETAILED DESCRIPTION

A. Glossary of Terms

As used herein, each of the following terms has the meaning described below:

An adaptive filter is a time-varying, self-adjusting, digital signal processing device for controlling the performance of a system. This device acts upon an input signal (sometimes referred to as a reference signal) and produces an output signal. The system performance depends, at least in part, on this output signal. The filter automatically optimizes its processing of the input signal (i.e., it adapts) in order to minimize the difference between the actual and desired system performance.

A specific type of adaptive filter, referred to as a transversal filter, processes the input signal by linearly combining sequential time-samples of the input signal at various fixed delays, with respective variable weights.

An echo-like response to a mechanical disturbance of a system means a response that exhibits a detectable self-correlation at one or more time delays, where the self-correlation is independent of the waveform of the original mechanical disturbance, and is instead a consequence of temporal correlation in the impulse response of the system itself.

A generalized force is a force, pseudoforce, torque, or bending moment generated by any means, including a reaction mass or an intrastructural mechanical actuator.

Advanced reference signal refers to a reference signal for an adaptive filter in an adaptive regulator loop. This is best understood with reference to FIGS. 1 and 2.

Figure 1:
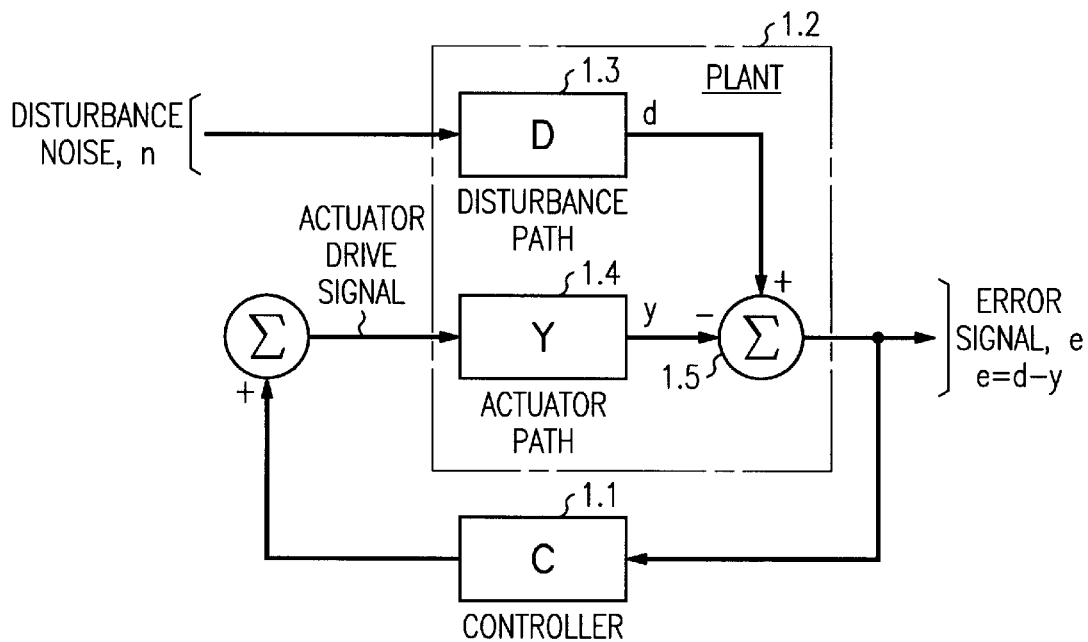
FIG. 1 is a conceptual diagram of a regulator, in a general sense, for performing active on control.

FIG. 1 illustrates, in a broad sense, the use of controller 1.1 to produce a corrective signal which combines in plant 1.2 with disturbance noise n in such a way as to reduce the resulting error signal e. As shown, plant 1.2 comprises disturbance path 1.3 and actuator path 1.4. Absent a signal input to plant 1.2, the output displacement is the error signal e (for a specific spatial location on the physical plant). This error signal represents the difference between the noise-only displacement response d and the actuator-only displacement response y. That is, e=d−y. In the case of a plant that is linear, responses d and y combine at the physical measurement location represented by the summing point 1.5.

Figure 2:
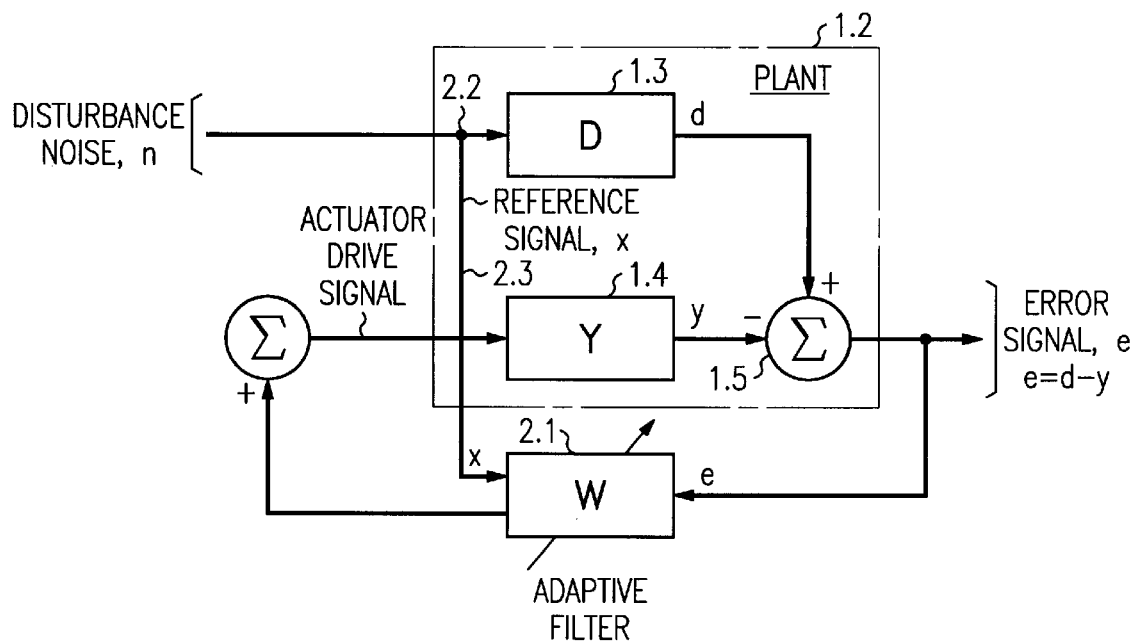
FIG. 2 is a conceptual diagram of an adaptive regulator for active vibration control.

One form of controller 1.1 is an adaptive transversal filter implementing the filtered-x least mean square (FXLMS) algorithm, which is well-known to those skilled in the art. This form of controller is illustrated in FIG. 2. (Certain essential features of implementations of the FXLMS algorithm have been omitted from the figure to simplify it.)

It will be appreciated that there are common elements, denoted by similar reference numerals, in FIGS. 1 and 2. However, adaptive filter 2.1 has been substituted in FIG. 2 for controller 1.1. Moreover, line 2.3 has been added, bringing reference signal x from tap point 2.2 to the reference input part of the adaptive filter.

The configuration shown in FIG. 2 is one conventional in the art. The reference signal x is advanced in the sense that each segment (in time) of signal x is received at filter 2.1 before the corresponding segment of error signal e is received at filter 2.1. Signal e arrives after a delay due to the latency inherent in the disturbance path 1.3. In conventional adaptive regulator configurations, it is considered desirable for signal x to be advanced in order to compensate for the combined latency inherent in the adaptation process of filter 2.1 and the actuator path 1.4. This makes it possible for filter 2.1 to remove broad-band noise from the error signal by cancelling noise components that correlate with signal x.

In practical implementations, tap point 2.2 is advantageously situated at a point on a mechanical structure that lies as close as physically possible to the entry point of the disturbing force on the structure. For example, an error sensor and an actuator may be situated on the roof of a high-rise building for stabilizing the sway of the building against earthquake loading. In such a case, a useful location for tap point 2.2 would be at ground level, where a suitable transducer, such as a seismic accelerometer, would provide an electrical reference signal.

Thus, when a reference signal is said to be an advanced reference signal, what is meant is that there is a positive time delay between the presence of a given signal at the reference location, and the later arrival of the same, or a similar, signal at the error location. Stated another way, if an impulsive force were applied to the structure at the entry point of disturbance forces, then the reference sensor would respond before the error sensor produced an indication of a structural response.

Figure 3:
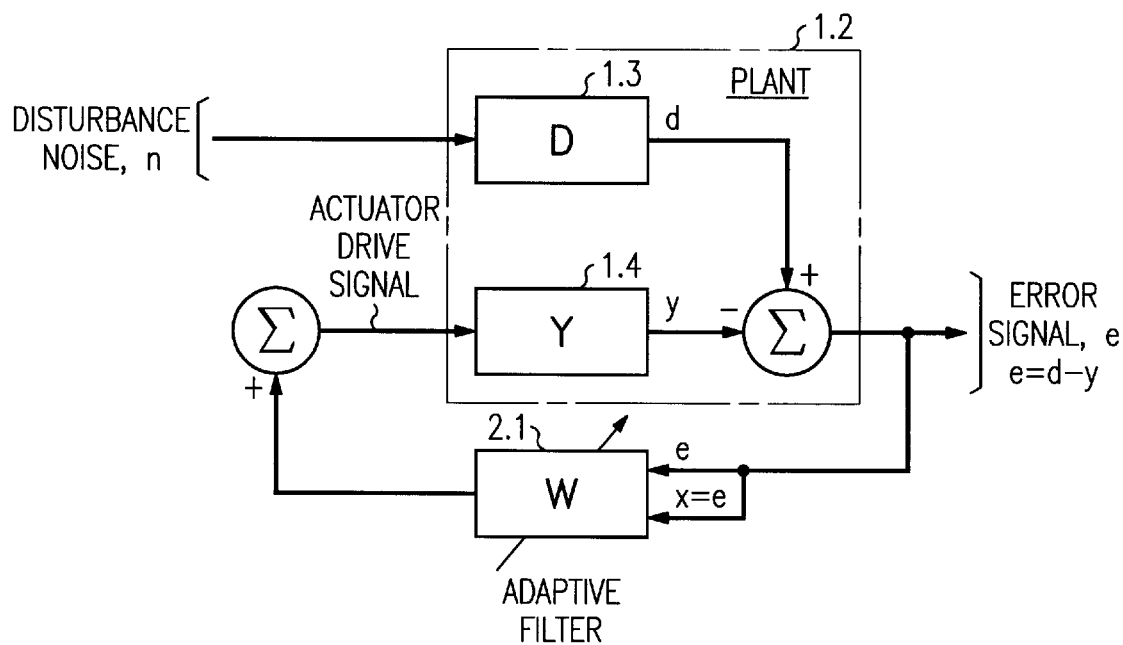
FIG. 3 is a conceptual diagram of an adaptive regulator in which the error and reference signals the same. This is a special case of a regulator using a non-advanced reference signal.

Non-advanced reference signal is best understood with reference to FIG. 3. It will be appreciated that line 2.3 and tap point 2.2 are absent from FIG. 3, and instead, the error signal e also functions as the reference signal x. This represents a departure from adaptive control methods of the prior art, in that the reference signal does not arrive at filter 2.1 in advance of the error signal. This is one instance of a non-advanced reference signal.

In practice, a non-advanced reference signal may be taken not only directly from the error signal, but also from, as but one example, a tachometer which generates a narrowband (typically, sinusoidal) signal or signals directly related to shaft rotation frequency in a rotating machine that is to be stabilized Another example of a non-advanced reference signal is the output of a roof-level sensor on a high-rise building that generates a broadband signal related to building sway, and acts in concert with an error sensor and an actuator situated within the building or near ground level.

In a general sense, to say that a reference signal is non-advanced means that there is a zero or negative time-delay between the presence of a given signal at the reference location and the arrival of the same, or a similar, signal at the error location. Thus, the reference sensor would respond to an impulsive force applied at the disturbance-force entry point simultaneously with or after the error sensor responded to the same impulsive force.

Figure 4:
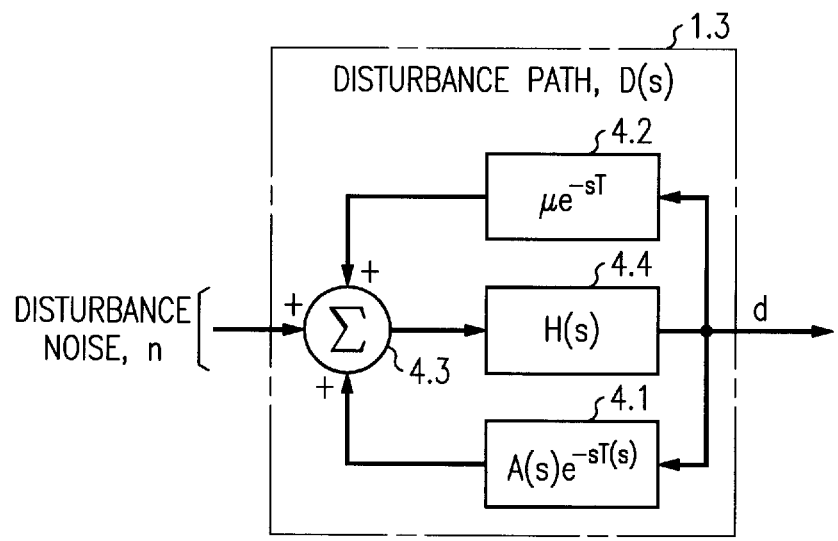
FIG. 4 is a conceptual diagram of the vibrational behavior of a resonant structure having fixed time-delay regenerative feedback.

Regenerative feedback is best understood with reference to FIG. 4, in which disturbance path 1.3 has been expanded to include H(s) (Box 4.4), the structural response function assuming infinite-impedance (i.e., reflection-free) boundary conditions; $A(s)e^{sT(s)}$, which is indicated in Box 4.1 and represents a structural boundary condition response that produces an echo-like response at a frequency-dependent time delay T(s), leading to structural resonant dynamics; and $\mu e^{-sT}$, which is indicated in Box 4.2 and represents an echo effect that has a fixed time delay T which is independent of the structural resonances. (Such a fixed time delay may, for example, be the period of a rotating toolpiece in a machining system, as discussed below.) It will be understood that $\mu$ is a frequency independent amplitude, A(s) is frequency-dependent amplitude, and s is the Laplace-transform frequency variable. In the specific context of machining operations, $\mu$ may be the fractional overlap ($0 \leq \mu \leq 1$) between successive cuts.

As shown in FIG. 4, both Box 4.1 and Box 4.2 are included in respective feedback loops that return a portion of the structural noise response to summing point 4.3. Both of these loops lead to echo-like responses to the disturbance n. However, the resonant feedback represented by Box 4.1 is not regenerative feedback according to our meaning of this term. On the other hand, the fixed-time-delay feedback represented by Box 4.2 is regenerative feedback if a portion of the response of the system that is real-valued and of a fixed magnitude adds to the disturbing noise in a purely time-delayed (periodic or quasiperiodic) manner.

Resonant feedback represented by Box 4.1 adds to the disturbing noise via the filtering mechanism $A(s)e^{-sT(s)}$, where A(s) is a complex-valued function which, in conjunction with the frequency-dependent time-delay term T(s), gives rise to stable resonant dynamics.

The regenerative feedback loop, on the other hand, can produce an unstable output response d. This will occur if the relevant loop gain exceeds unity and the phase angle between disturbance noise n and displacement response d exceeds 180 degrees.

Significantly, positive regenerative feedback can readily destabilize a resonant system, because the regenerative loop gain tends to be high at the resonant frequency. For this reason, the concurrence of a regenerative feedback loop 4.2 with a resonant feedback loop 4.1 can produce an unstable output response d. (An unstable output response is characterized by a continuously-growing magnitude of the output over some significant length of time, such as, for example, a time interval that is long relative to a resonant period.

B. Adaptive Control of Echo-Like Mechanical Vibration Phenomena

The controller configuration depicted in FIG. 3 involves operation of adaptive filter 2.1 with a reference signal x that is tapped directly from error signal e, and therefore is neither advanced nor delayed relative to the error signal.

Theoretically, the bandwidth of vibrational frequencies over which this configuration is effective will depend upon the degree of self-correlation in the disturbance signal d, because the adaptive filter is operating effectively only insofar as it is removing self-correlated (or resonant) components that it finds in the error signal e.

This theoretical limitation does not generally apply to the conventional use of an adaptive filter with an advanced reference signal. However, it should be noted in this regard that adaptive filters structured as in FIG. 3, with the reference signal tapped directly from the error signal, have not hitherto been used for controlling vibrations in mechanical structures. One obstacle to such an application is the incorrect assumption that an advanced reference signal is required in order to make any adaptive FXLMS controller perform effectively.

By contrast, we have demonstrated that control of structural resonant response, as well as control of regenerative feedback effects, can be achieved using a single error-sensing location which also serves as the reference input to the filter. Thus, we have shown that it is feasible to use the control structure of FIG. 3 to solve certain vibration-control problems.

It should be noted in this regard that the control structure of FIG. 3 is particularly useful when a time-advanced reference signal is not physically attainable, for example in machining operations in which the error sensor should be situated as close as practicable to the cutting tip. This control structure is also particularly useful where resonant dynamics are to be controlled, and a cost savings is provided by the single-sensor approach.

The controller configuration depicted in FIG. 3, and more generally, adaptive controller configurations in which a non-advanced reference signal is applied to the adaptive filter, are advantageously applied to solve the broad class of vibration problems represented in FIG. 4. These are problems in which the presence of one or more structural resonances (Box 4.1), or the presence of regenerative feedback (Box 4.2), produces vibrational instabilities at or near the structural resonances.

Removal by the adaptive filter of self-correlated components from the error signal (where there is one error/reference sensor) or of components cross-correlated with the reference signal (where the reference signal is non-advanced and from a different sensor) may be understood as removal of those signal components that are associated with the time-delayed feedback paths 4.1 and 4.2. When, for example, adaptive filter 2.1 (see FIG. 3) is well adapted, error signal e will behave approximately as the output of the reflection-free structural response function H(s) (Box 4.4 of FIG. 4), driven by noise source n, with the echo-path effects (i.e., those due to Boxes 4.1 and 4.2) removed or significantly reduced within the controller bandwidth $BW_{con}$.

The controller bandwidth can be estimated from the following considerations:

(i) For a natural resonant response of a system to be controllable, the total actuator path delay $T_{DEL}$ should be less than one-half the resonant period $T_{RES}$; i.e., $T_{DEL} < \frac{1}{2} T_{RES}$. The delay $T_{DEL}$ includes contributions from computer-sampling delay, signal-conditioning delay such as filter delay, and delay in the actuators.

(ii) For a regenerative vibration to be controllable, the actuator path delay should be less than a period $T_{REV}$ of the machine rotation or other periodic input of energy that is driving the instability. That is, $T_{DEL} < T_{REV}$.

In view of these considerations, it is evident that in operation, the non-advanced reference signal is effectively advanced in time relative to a pertinent echo period (characterized by $T_{REV}$ or $T_{RES}$, or, in some cases, a multiple thereof).

Thus, the effect of the vibration controller may be understood as removing the natural resonant behavior of the plant when it is excited by a finite-bandwidth noise source. Conditionally, the controller may be further understood as removing the periodic influence of regenerative feedback. This is so on condition that the length of the adaptive filter (i.e., the total length of time spanned by the taps of the filter plus any intervening circular buffers or other programmed delays in lieu of unused taps) is great enough to encompass at least one period T.

We believe that our vibration controller is useful for reducing vibration in a broad range of mechanical structures including, without limitation, machinery for cutting, grinding, milling, and drilling metal workpieces, optical and electromagnetic projections systems, space frames, bridges, other truss or beam structures, rotating propulsive engines, and spacecraft antennas. (In reference to the last-named item, we believe that our vibration controller will be useful for reducing the well-known phenomenon of jitter in spacecraft antennas.)

Figure 5:
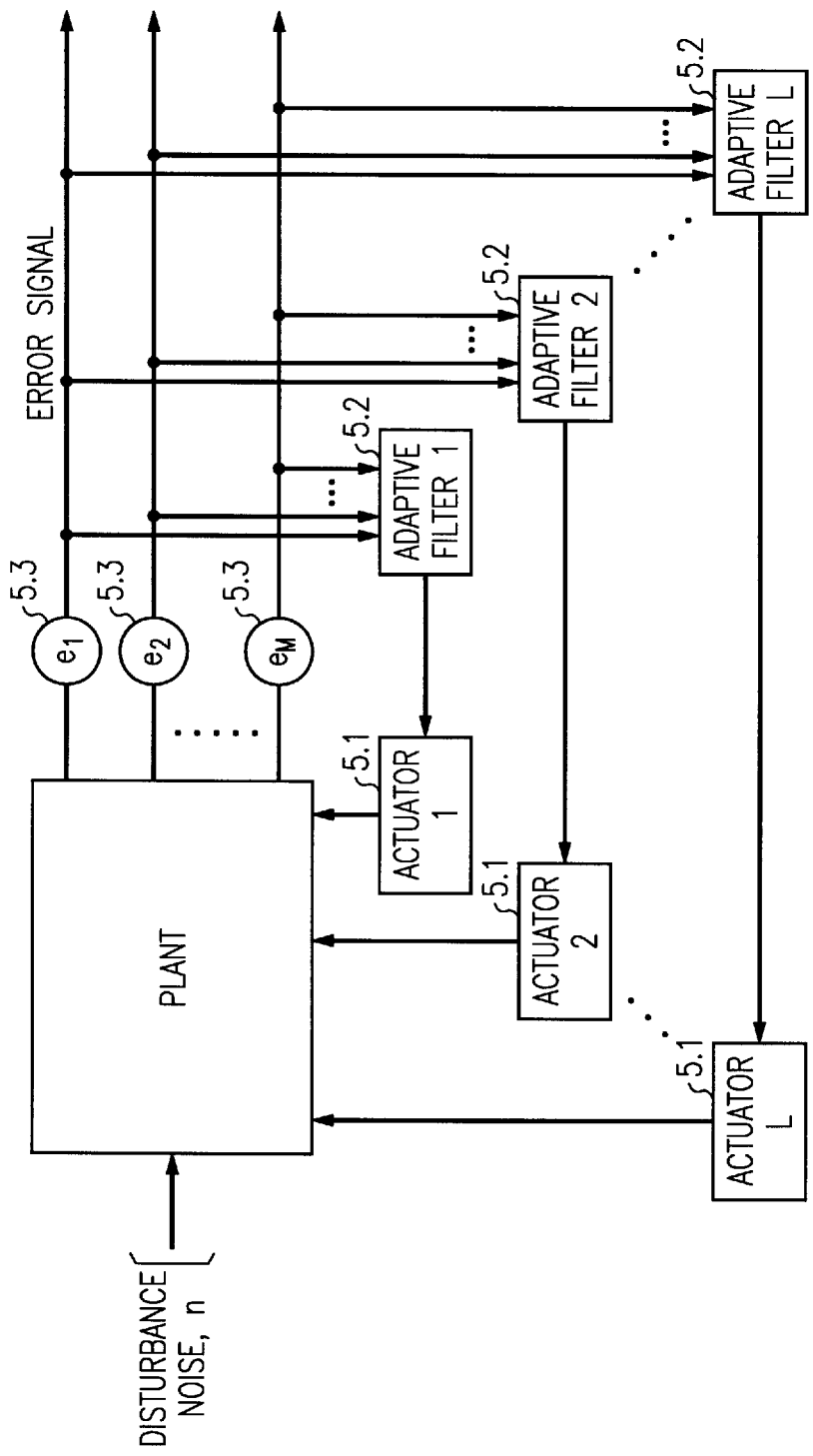
FIG. 5 is a conceptual diagram of an adaptive regulator having multiple error sensors and multiple mechanical actuators.

A general approach for such applications is illustrated in FIG. 5. Each of L actuators 5.1 is driven by a respective adaptive filter 5.2. Each of M error sensors 5.3 sends a respective error signal to each of the L adaptive filters. For each of the adaptive filters, a respective one of the M error sensors provides the reference input for that filter. The convergence step of each adaptive filter includes a contribution from each of the M error signals. The size of this contribution is related to an estimate of the transfer function between the relevant error sensor and the relevant actuator. This is explained in greater detail below.

Various kinds of mechanical motion may be sensed by the error sensors, including bending modes (typically of two orthogonal types referred to, respectively, as parallel and tangential), torsional modes, axial modes (at least in structural members that are significantly compressible in the axial direction), and shell modes. Respective ones of the multiple error sensors may detect different kinds of motion at the same location, the same kind of motion at different locations, or different kinds of motion at different locations, or there may be some combination of these various schemes. Similarly, the L actuators may be adapted to drive different kinds of motion at the same location, the same kind of motion at different locations, different kinds of motion at different locations, or some combination thereof.

C. Regenerative Chatter in Machining Operations

One source of unwanted vibrations in machining operations is regenerative feedback that occurs when a past feature of the motion of the toolpiece makes a reinforcing contribution to the toolpiece motion at a later time. Such a time-delayed, positive feedback mechanism can arise, for example, during metal-turning operations in which the current width-of-cut overlaps a portion of the cut made during the preceding revolution of the workpiece.

The resulting toolpiece vibrations, which are referred to as "chatter," tend to limit the quality of finish that can be obtained on the tooled surface of the workpiece.

An early, theoretical description of this phenomenon was proposed in H. E. Merritt, "Theory of Self-Excited Machine-Tool Chatter," *Journal of Engineering for Industry*, (November 1965). In this work, Merritt introduced a regenerative feedback coefficient $\mu_M$ based on the fractional overlap of cutting width from one workpiece revolution to the next.

Figure 6:
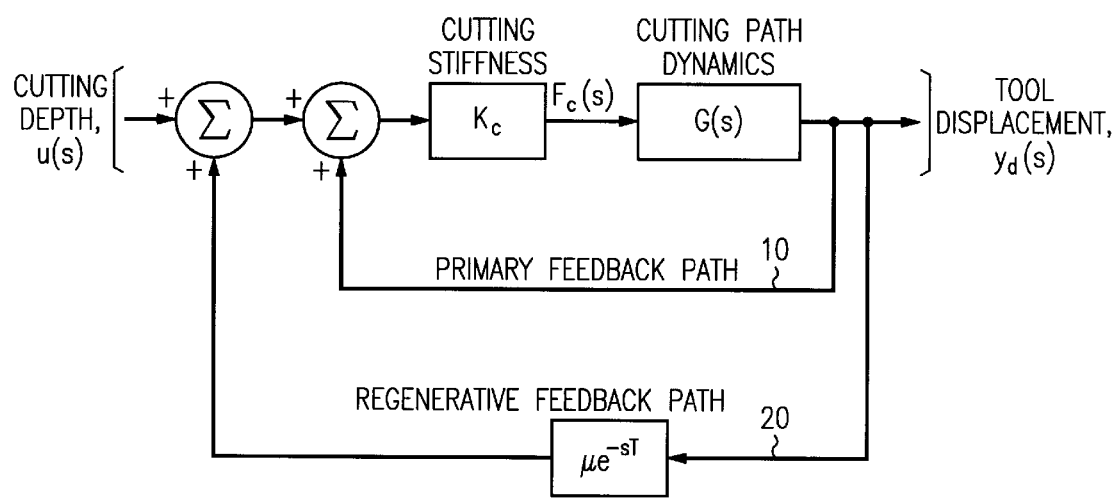
FIG. 6 is a schematic depiction of the regenerative feedback system that exists during metal-turning operations, according to a theoretical model due to H. E. Merritt.

The Merritt model is illustrated schematically in FIG. 6. As shown, the primary feedback path 10 relates the tool displacement $Y_d$ (s) to the instantaneous cutting depth u(s). (It will be understood that the variable s is the frequency variable well-known from Laplace-transform techniques.) The regenerative feedback path 20 is characterized by the coefficient $\mu M$ and the delay factor $e^{-sT}$, which represents a delay by one rotational period T. The variable $F_c(s)$, indicated in the figure, represents the frequency-domain cutting forces, which are related to the instantaneous cutting depth via the cutting stiffness $K_c$. The tool motion is the response to these forces. The cutting-path dynamics G(s) relate the tool response to the applied cutting force. These dynamics typically will represent tool dynamic properties during the machining of a relatively stiff or thick-walled workpiece.

We have discovered that there are at least two kinds of chatter that are driven by regenerative feedback. We refer to these kinds of chatter, respectively, as "broadband regenerative chatter" and "narrowband regenerative chatter." Significantly, both of these kinds of chatter exhibit substantial self-correlations at time delays that are multiples of a rotational period. In this sense, they both are echo-like responses to mechanical disturbance. Some understanding of regenerative chatter can be gained from the power spectra of, for example, tool displacement during the machining of a rotating workpiece. In such spectra, both broadband and narrowband chatter exhibit fine structure with spectral lines that are regularly spaced at increments equal to the rotational frequency.

Narrowband chatter is typically observed during the machining of relatively hard materials such as nickel alloys and titanium, at lower rotational speeds. By contrast, broadband chatter is typically observed during the machining of relatively soft metals such as aluminum and steel at relatively high rotational speeds. However, there is no distinct division between a regime of hardness and speed that pertains to narrowband chatter, and such a regime that pertains to broadband chatter.

Figure 7:
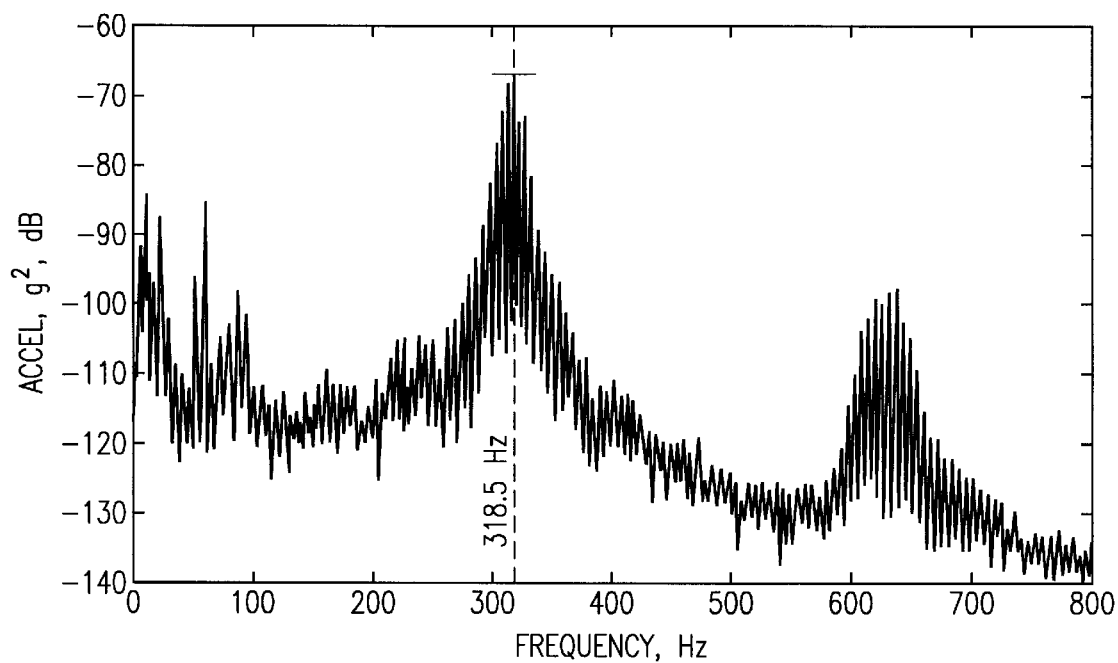
FIG. 7 is an illustrative power spectrum of the toolpiece displacement during a typical metal-turning operation which exhibits broadband chatter. In this figure, the workpiece rotational velocity is 5.75 Hz, the workpiece material is 4130 steel, the depth of cut is 0.5 mm, and the feedrate is 0.0325 mm per revolution. There is typically some overlap between each cut and the previous cut. The precise amount of overlap generally depends upon the feedrate. A tool bit is mounted on a cantilevered boring bar with an overhang ratio L/D of 6. The parameter L represents the length of the boring bar and the parameter D represents the diameter of the boring bar.
Figure 8:
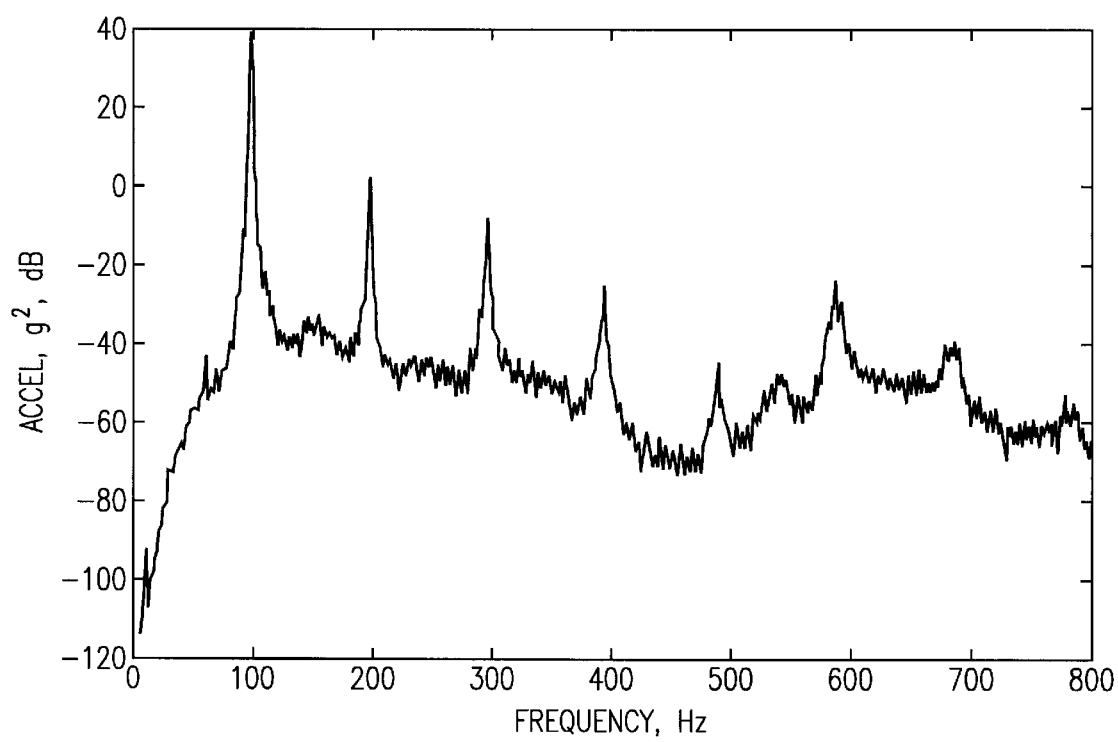
FIG. 8 is an illustrative power spectrum of tangential toolpiece displacement during a typical metal-turning operation that exhibits narrowband chatter. An inconel workpiece rotates at 0.47 Hz at a depth of cut of 0.51 mm, a feedrate of 0.25 mm per revolution, and an overhang ratio of 11.

One distinction between broadband and narrowband chatter is apparent from the power spectra mentioned above. A spectrum of broadband chatter will exhibit a main peak centered upon a frequency that lies, typically, 10%–30% above a natural frequency of the boring bar. Such a peak is evident at a fundamental frequency of 318.5 Hz in FIG. 7, together with a peak near the first harmonic. (It will be understood that each of these peaks is a composite of multiple spectral lines as discussed above.) By contrast, a spectrum of narrowband chatter will typically exhibit narrower peaks centered at one or more resonant frequencies of the tool or workpiece. Such a spectrum is provided in FIG. 8.

The Merritt model has achieved some success in elucidating the mechanisms responsible for broadband regenerative chatter. However, no application of the techniques of active vibration control has hitherto been able to reduce either broadband or narrowband chatter sufficiently to provide the quality of surface finish demanded by customers of advanced machining operations.

Figure 9:
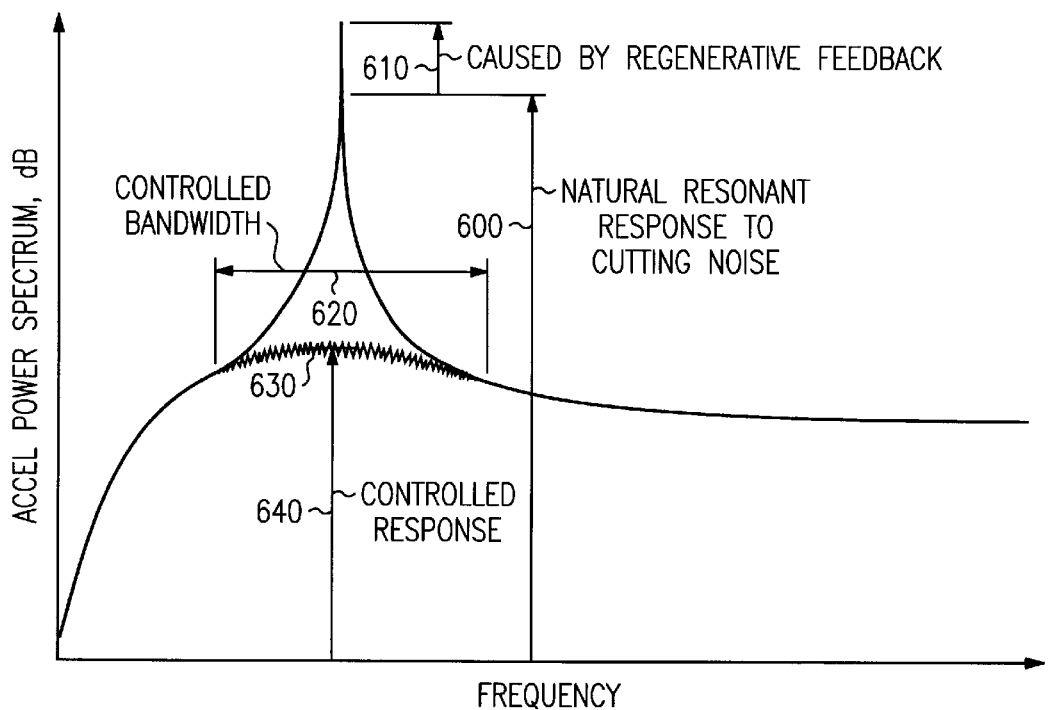
FIG. 9 is idealized power spectrum of narrowband chatter.

We have discovered that when relatively hard metals are cut (under conditions leading to narrowband chatter), the regenerative loop 20 (see FIG. 6) in the disturbance path tends to create an instability in the plant at one of the structural resonances (at any given time). We have found that the technique of FIG. 3 (exemplarily using the error signal as a non-advanced reference signal) is effective for reducing the regenerative feedback effect while also reducing the structural resonant energy. This is illustrated by the various features of the idealized power spectrum of FIG. 9, in which a resonant peak is subdivided into a portion 600 attributable to the natural resonant response to cutting noise, and a portion 610 attributable to regenerative feedback. The controlled bandwidth is indicated in the figure as range 620, and the controlled response of the mechanical structure is indicated by curve portion 630 and amplitude 640.

We have further discovered that when softer metals are cut at relatively high rotational velocities (under conditions leading to broadband chatter), loop 20 (see FIG. 1) creates an instability in the plant at a collection of frequencies that lie above a free-bar resonant frequency. In this instance, we have found that the technique of FIG. 3 will counteract the regenerative loop only if the adaptive filter is long enough to span at least one rotational period of the workpiece.

Figure 10:
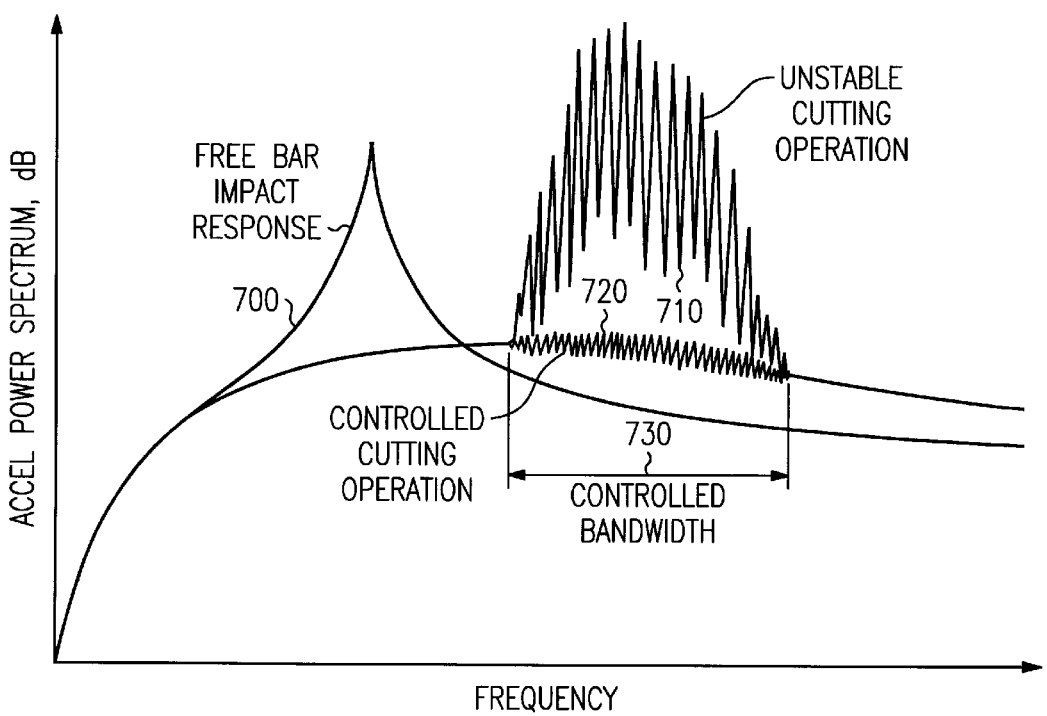
FIG. 10 is an idealized power spectrum of broadband chatter.

This is illustrated by the various features of the power spectrum of FIG. 10, in which curve 700 represents the idealized free-bar impact response, curve portion 710 represents an unstable cutting operation, and curve portion 720 represents a corresponding, controlled cutting operation. Range 730 represents the controlled bandwidth.

D. Illustrative Embodiments

Our technique differs from the technique of the Rouch patent in that, inter alia, we do not apply Modern Control Theory to generate an actuator control signal. Instead, as noted above, we use an adaptive transversal filter to automatically update the coefficients that characterize a corrective signal to be applied to the actuator. We believe that our own technique is effective for suppressing echo-like responses to mechanical disturbances in many kinds of mechanical systems. In the specific context of machining operations, our invention is effective for suppressing both broadband and narrowband regenerative chatter.

By applying well-known computational methods such as the FXLMS algorithm, the adaptive filter operates upon an appropriate reference signal to generate the corrective signal. Each coefficient specifies the fractional contribution, or weight, of a component of the corrective signal that is generated by delaying the reference signal by a respective increment. (These increments are typically designed or programmed into the filter. By analogy to an analog delay line, each increment is often said to relate to a respective "tap" of the filter.) The weights are periodically updated in such a manner as to drive downward the magnitude of an error signal.

It is a significant feature of our invention that the adaptive filter receives a non-advanced reference signal. In fact, in certain embodiments the reference signal and the error signal both correspond substantially to the same time-varying descriptor of toolpiece motion, and can, in fact, be provided by the same tool-motion sensor. This descriptor is typically either the displacement function or the acceleration function of the toolpiece. (The acceleration function is the second derivative of the displacement function.)

Embodiments of the invention that use the same sensor to provide both the error and reference signals are particularly useful for suppressing broadband chatter. In such an application, there is a known correlation between current toolpiece deflections caused by regenerative feedback and those deflections that will occur one rotational period later. The filter tap whose corresponding delay most closely matches the rotational period of the workpiece will typically make a substantial contribution to the corrective signal. (Taps lying near submultiples of the rotational period, i.e., near multiples of the rotational frequency, will also contribute significantly to the corrective signal, although their contribution will generally be smaller.) In fact, in at least some cases the convergence of the filter coefficients (i.e., during adaptation) can be improved by augmenting the filter with an optional delay line adjusted to delay the reference signal by one rotational period (and thus, in effect, to add one rotational period to each of the filter taps).

We now describe an advantageous embodiment of our invention for the purpose of suppressing chatter in machining operations in which a stationary toolpiece cuts a rotating metal workpiece. It should be noted that this description is illustrative and not limiting. In fact, we believe that our invention is advantageously applied for suppressing vibrations in other kinds of machining operations, including those in which the workpiece is stationary and the toolpiece rotates, as in various milling, drilling, and grinding operations. More generally, we believe that our invention is advantageously applied for suppressing echo-like responses to mechanical disturbances in mechanical systems of many kinds, as noted previously.

Figure 11:
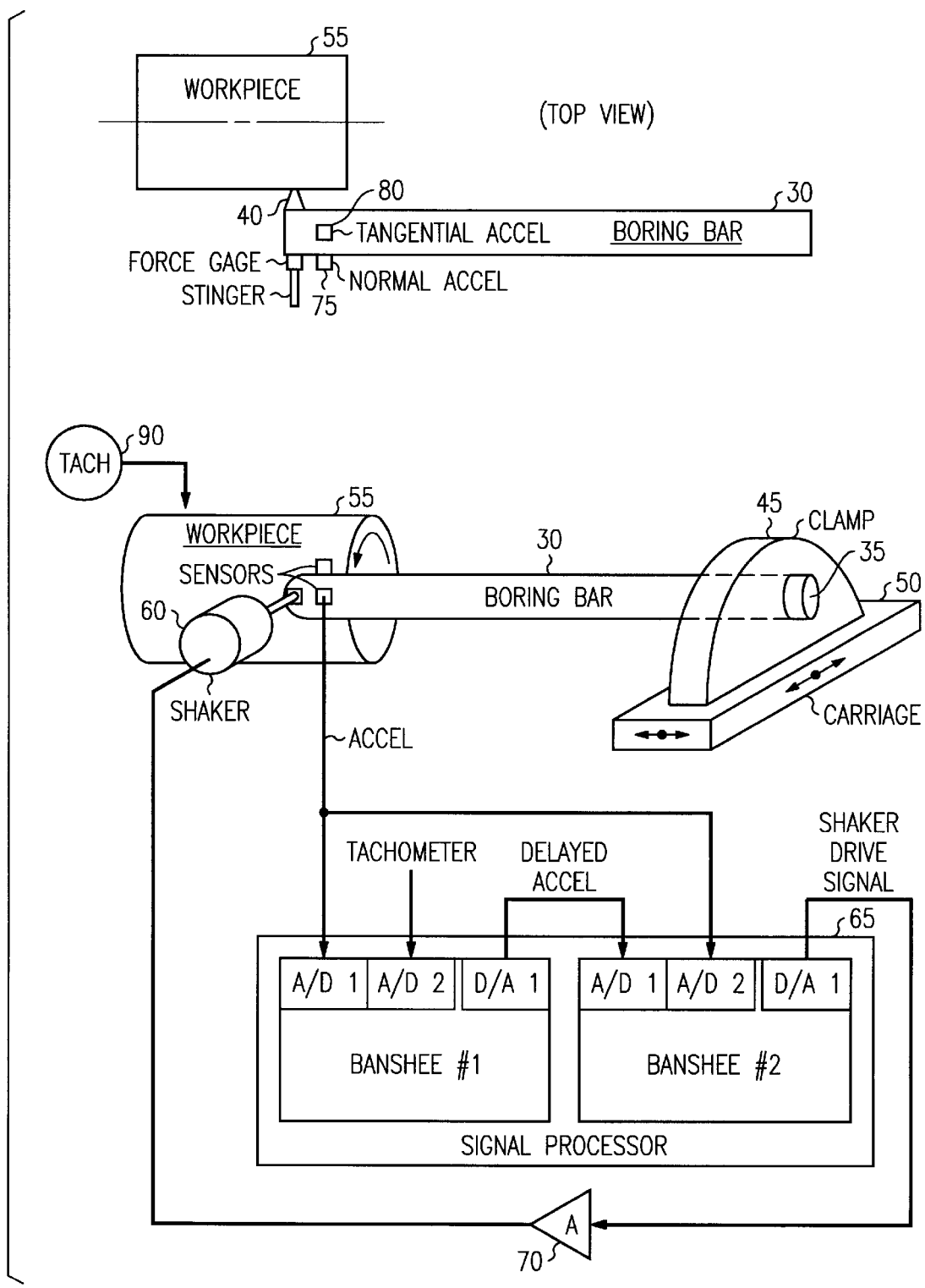
FIG. 11 a schematic representation of a metal-turning machine, including a rotating workpiece. Also depicted in the figure are a signal processor and electromechanical actuator for carrying out the inventive method, in one embodiment.

As depicted in FIG. 11, a typical metal-turning installation includes a boring bar 30 mounted at one end 35. Mounted at the opposite end of the boring bar is a cutting bit 40. The support 45 for the boring bar is mounted on a movable carriage 50. By movement of the carriage, the cutting bit can be brought into contact with a workpiece 55. Means (not shown) are provided for rotating the workpiece with a rotational period T seconds and a rotational velocity F Hz, wherein F=1/T.

Also shown in the figure is an electromechanical actuator 60 for displacing the cutting bit in accordance with corrective signals issued from signal processor 65 and amplified by amplifier 70. At least one sensor is required for sensing the motion of the tool bit or boring bar.

Two illustrative sensors are shown in the figure. One of these is normal accelerometer 75, which senses acceleration of the boring bar, at a point near the tool bit, in the direction normal to the workpiece surface (at the point of application of the cutting tool). The other of these is tangential accelerometer 80, which senses acceleration of the boring bar in the direction tangential to the workpiece surface (and normal to the long axis of the boring bar). The acceleration signal is readily used directly as the descriptor of tool-bit motion. Alternatively, a related signal, such as a velocity or displacement signal, can be used as the descriptor. We currently prefer to use a displacement signal X(t), which is proportional to the displacement of the cutting bit, because this signal is directly related to the resulting surface finish.

If the motion sensor is an accelerometer, it is necessary to twice integrate the accelerometer output in order to provide a displacement signal X(t). This operation is advantageously performed by signal processor 65, as described in greater detail below.

It will be appreciated that various other mechanical motions of the cutting bit and boring bar may be of interest in the application of the methods described herein. Such other motions may include, for example, torsion of the boring bar, and flexion of the boring bar in the directions normal and tangential to the workpiece surface. In addition, it may be advantageous to measure any of these motions at locations on the boring bar that are removed from the position of the toolpiece. It will be further appreciated that although the use of accelerometers is currently preferred, other kinds of motion sensors are available, and their use in this context will be readily apparent to the skilled practitioner. Such other sensors may include, for example, optical sensors and piezoelectric strain gauges.

Significantly, we have found that normal displacement signals are generally more effective for controlling broadband chatter, whereas tangential displacement signals are generally more effective for controlling narrowband chatter.

As noted, the output of at least one sensor is provided as input to the signal processor. A tachometer 90 is also advantageously provided, and its output signal also advantageously provided to the signal processor. The purpose of the tachometer is to provide a current reading of the rotational velocity F.

Actuator 60 is exemplarily an electrodynamic shaker. (In such a device, the current through a magnetic winding is directly proportional to the force imparted to a coil and to a piston attached to the coil. This piston is sometimes referred to as a "stinger.") It will be appreciated that other kinds of actuator are useful in this context, as will be readily apparent to the skilled practitioner. Other such actuators include, for example, piezoelectric stacks used as force drivers for inertial actuator masses, or for articulated clamps which direct the actuation force through the base of the boring bar.

Significantly, we have found that for controlling broadband chatter, it is generally most effective to arrange the actuator such as to produce toolpiece displacements normal to the surface of the workpiece. On the other hand, for controlling narrowband chatter, we have found that tangential displacements of the toolpiece are generally more effective.

Figure 12:
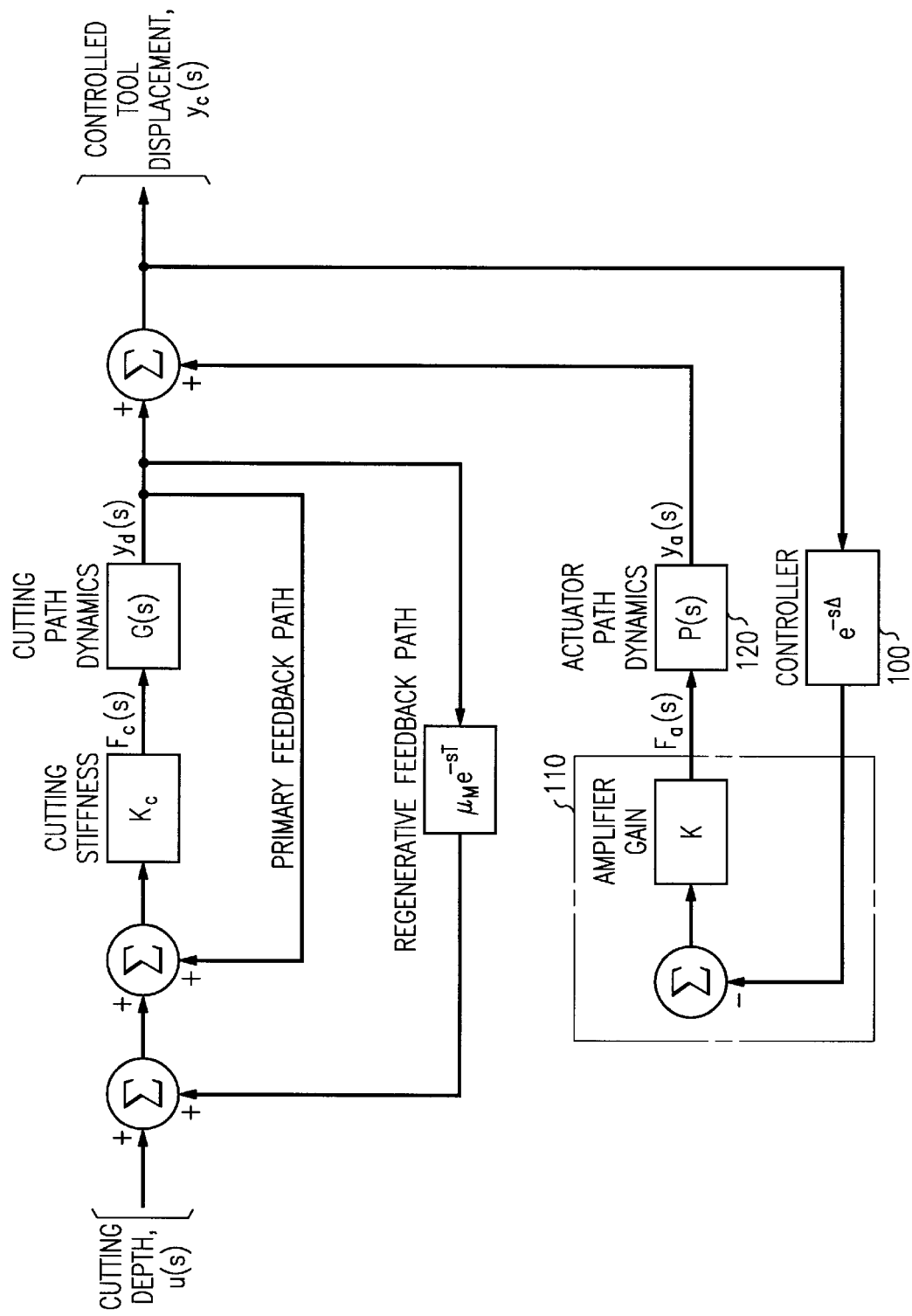
FIG. 12 is a schematic representation of a control system added to the feedback system of FIG. 6. This control system provides a corrective signal $F_a(s)$ for controlling the tool displacement. This corrective signal is derived, in part, by delaying the tool displacement signal by one rotational period using an adjustable delay device, and by adding an amplifier gain K.

Turning now to FIG. 12, a simple way to provide a corrective signal $F_a(s)$ is to feed back the tool displacement signal. For correcting broadband chatter (but not, in general, for correcting narrowband chatter), this signal is fed back after applying a delay $\Delta$ approximately equal to the rotational period T. This delay is produced in signal processing element 100, which may be an analog delay line, but is preferably a digital signal processor having analog-to-digital (A/D) conversion on its input end, and digital-to-analog (D/A) conversion on its output end.

The corrective signal (after being delayed, if appropriate) is amplified in inverting amplifier 110 and applied to the actuator (modeled in the figure as block 120) to produce a corrective displacement $y_a(s)$. This corrective displacement is summed at the cutting bit with the other displacements inherent in the cutting system to produce the total displacement $y_c(s)$. A sensor, such as accelerometer 75 or 80 of FIG. 11 (together with an appropriate signal integrator, if required) provides displacement signal X(t) which is proportional to the cutting-bit displacement of interest.

The delay $\Delta$ and the amplifier gain K are adjusted (manually or automatically) to minimize observed chatter of the toolpiece. As noted, the optimum value of $\Delta$ for this purpose will be equal to the rotational period T.

Figure 13:
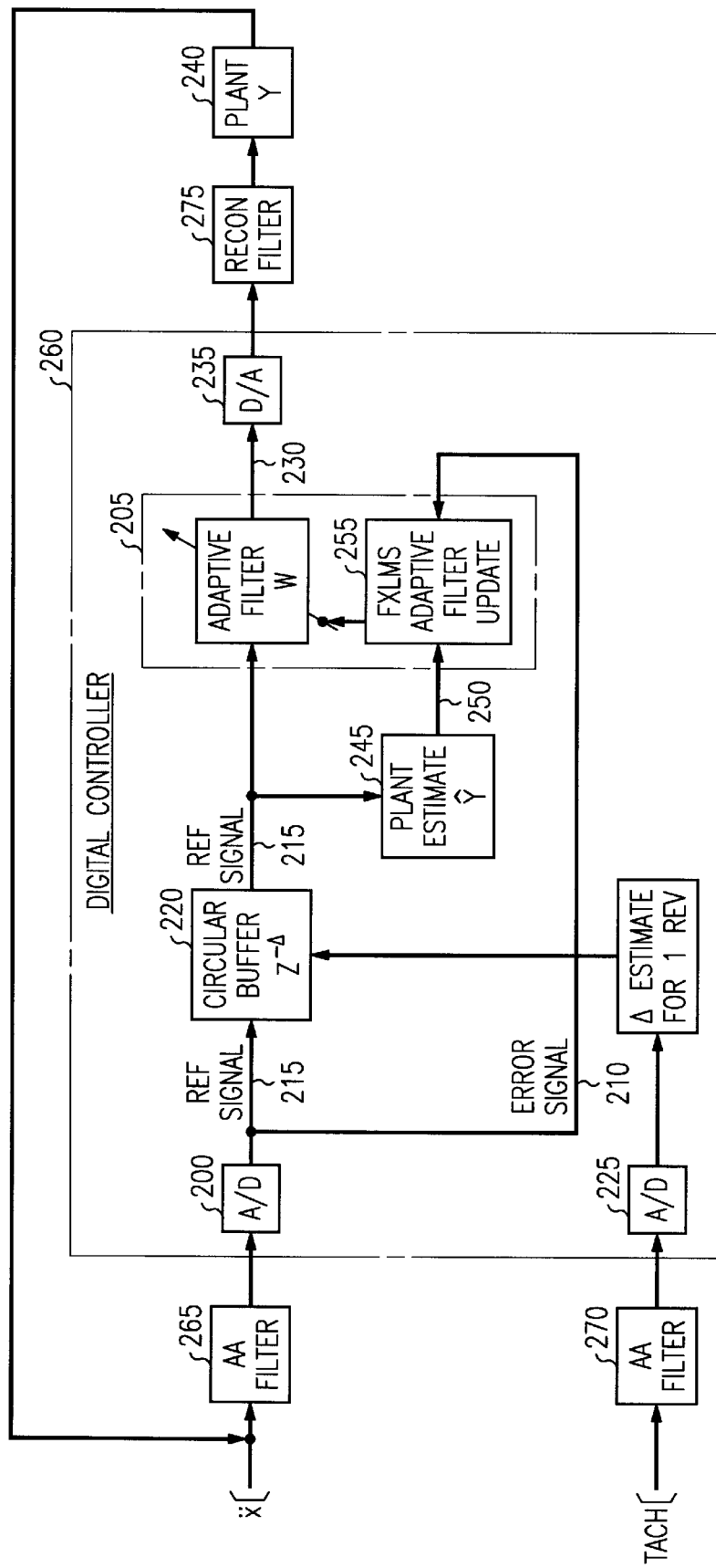
FIG. 13 is a schematic representation of a control system incorporating an adaptive filter, according to the invention in one embodiment.

Although the corrective system of FIG. 12 can afford significant noise reduction, still further improvements are achieved with the system of FIG. 13, which is currently preferred. In this system, the acceleration signal $\ddot{X}(t)$ (i.e., the second derivative of the displacement signal), (after A/D conversion in box 200), is fed to digital adaptive filter 205 as both error signal 210 and reference signal 215.

As noted above, reference signal 215 is optionally subjected to a time delay $\Delta$ before it is input to the adaptive filter. This delay is exemplarily provided by circular buffer 220. Updated estimates of the rotational period T (to which $\Delta$ is to be set) are provided to the circular buffer by a tachometer after A/D conversion (if required) as shown in box 225. (As noted, time-delay element 220 will not generally used in a corrective system for narrowband chatter.)

As discussed above, adaptive filter 205 generates a corrective signal 230, which is applied to the actuator after D/A conversion, as shown in box 235. The "plant," denoted by the symbol "Y" in box 240 of the figure, is the transfer function that relates the actual motion of the toolpiece to the electrical input to the actuator. Plant estimate $\hat{Y}$, which is a mathematical model of the plant Y, is advantageously provided, as shown in box 245, as a component of the corrective system. The reference signal is filtered in box 245 to produce filtered reference signal 250. Signal 250 and error signal 210 are provided as input for updating the weights of the adaptive filter, as represented by box 255. The weights are updated according to an algorithm to be described below.

As shown in the figure, adaptive filter 205, weight-updating unit 255, plant estimate 245, optional circular buffer 220, A/D converters 200 and 225, and D/A converter 235 are included within a functionality 260, which is referred to herein as a "digital controller." Although these various functions, either individually or in subcombinations, may be provided by separate components, it is currently preferred to have these functions performed by one or more digital signal processors. Such a processor or group of processors is to be identified with digital controller 260.

As is well known in signal sampling arts, anti-aliasing filters 265 and 270 are advantageously included to remove artifacts of the sampling process from the error signal and tachometer signal, respectively. Reconstruction filter 275 is advantageously included to smooth the corrective signal 230 and to remove digital artifacts introduced during the digital processing stage.

We currently prefer to use the well-known Filtered-X Least Mean Square (FXLMS) algorithm for updating the weight coefficients of the adaptive filter. This algorithm is described, for example, in B. Widrow and S. D. Stearns, *Adaptive Signal Processing*, Prentice-Hall (1985). Other, more computationally intensive algorithms could be used, for example to provide faster convergence to optimal weight vectors. However, such algorithms would tend to make greater demands on the computational power of the digital processor. It is significant in this regard that the number of calculations required to operate the adaptive filter tends to increase as the square of the number of filter taps.

According to the FXLMS algorithm, the equation governing the updating of the weight coefficients is:

$$w_{k+1}^{(i)} = \alpha w_k^{(i)} + 2\mu_{filt} e_k x_k^{(i)};$$

wherein $w_{k+1}^{(i)}$ is the updated weight vector for the adaptive filter, $w_k^{(i)}$ is the weight vector from the previous sample period, $\mu_{filt}$ is the convergence step size of the adaptive filter, $e_k$ is the current sample-period error, and $x_k^{(i)}$ is the reference signal vector after filtering through plant estimate 245. The symbol $\alpha$ represents a so-called leak factor having a positive value less than or equal to 1. A typical value of $\alpha$ used in our investigations is 0.9.

More specifically, the vector $X_k$ (i) is related to the error $e_k$ and the plant estimate $\hat{Y}$ according to:

$$x_k^{(1)} = e_k * \hat{Y}; x_k^{(i)} = x_{k-1}^{(i-1)}.$$

The * symbol represents the convolution operation. Conventionally, the signal that is convolved with $\hat{Y}$ is the reference signal, from a distinct reference sensor. Instead, we have indicated, here, that $\hat{Y}$ is to be convolved with the signal $e_k$ from the error sensor.

The index (i) runs from 1 to N, where N is the number of taps of the adaptive filter. An exemplary value for N is 1024. We have found that this value is effective for achieving wideband frequency rejection in the operation of the adaptive filter for controlling regenerative feedback in applications where broadband chatter is predominant.

More generally, N should be large enough to encompass at least one rotational period of the workpiece, and preferably encompasses two or more rotational periods.

In the case of multiple filters and multiple actuators, the above-described equations are generalized to the following:

$$[w_{k+1}^{(i)}]_\lambda = \alpha[w_k^{(i)}]_\lambda + 2(\mu_{filt})_\lambda \sum_{j=1}^{M} (e_k)_j (x_k^{(i)})_{\lambda j};$$

$$(x_k^{(1)})_{\lambda j} = (e_k)_m * \hat{Y}_{\lambda j}.$$

Here, L is the number of actuators, M is the number of sensors, the index λ ranges from 1 to L, and the index m ranges from 1 to M. The quantity $\hat{Y}_{\lambda j}$ is the transfer-function estimate between actuator λ and sensor j. For each adaptive filter, one error sensor serves to provide the reference input. That is the sensor whose output $(e_k)_m$ is convolved with the transfer-function estimate.

Generally, some residual error will be present in the tool-displacement signal (or, equivalently, in the accelerometer signal) even after the filter has adapted and the values of the weight coefficients have stabilized. This error represents the noise that is uncorrelated between successive workpiece rotations. It is explainable as the uncorrelated portion of the response of the cutting system to the cutting of fresh material.

The corrective system described above is optionally augmented by a linear regulator feedback loop around adaptive filter 205. Because such a feedback loop can compensate natural dynamics of the boring bar, it may further improve the surface finish by suppressing linear response noise that remains in the error signal.

It should be noted in this regard that each of the respective feedback loops (i.e., the FXLMS loop and the linear regulator loop) will affect the plant transfer function of the other. Thus, one or more iterative cycles may be required in order to determine stable plant estimates for the respective loops. In an exemplary such loop, the adaptive filter is first allowed to converge, then a plant estimate is determined for the linear regulator loop, and then a new plant estimate is determined for the FXLMS loop.

EXAMPLE

Figure 14:
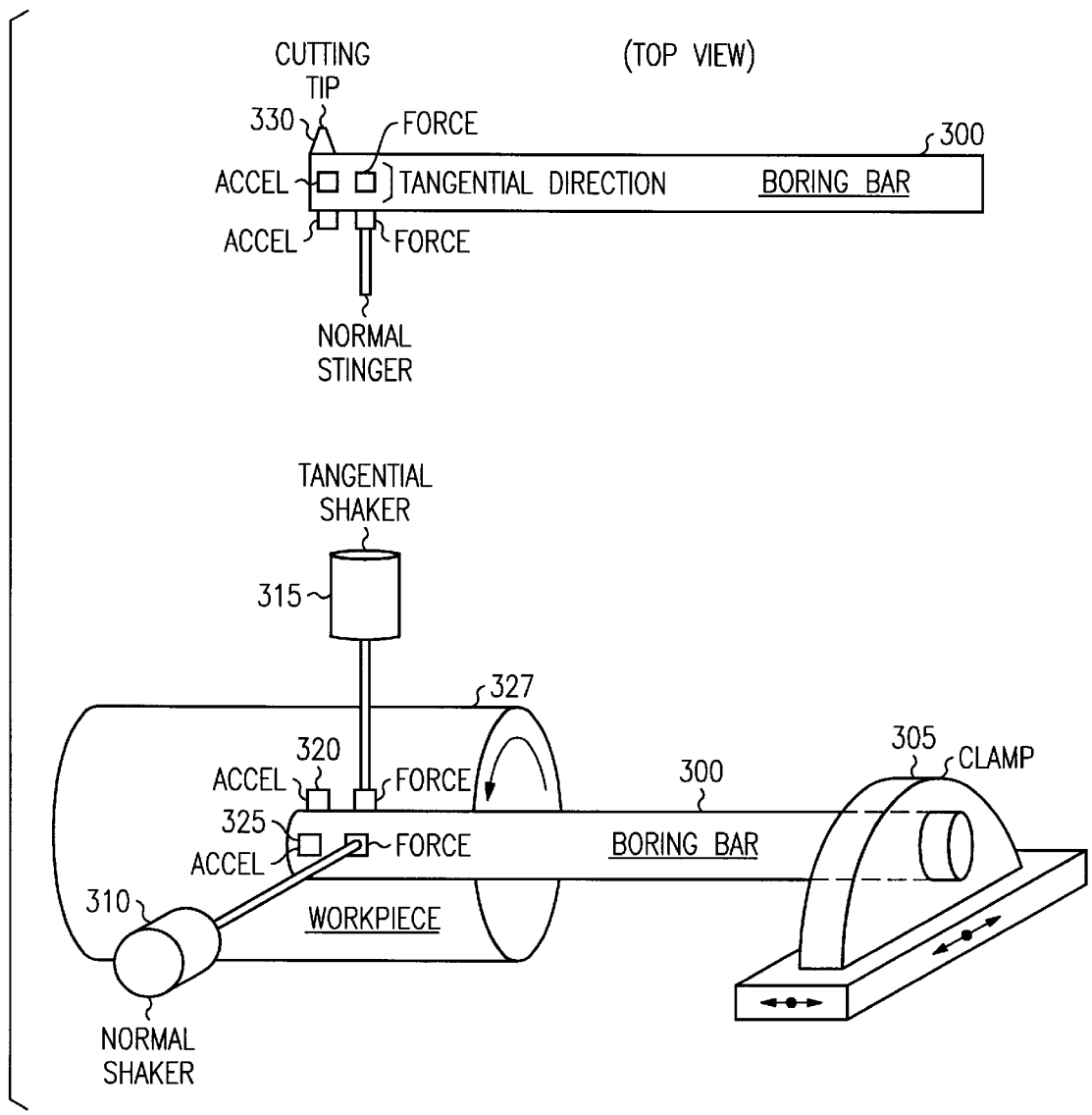
FIG. 14 is a schematic representation of controlled metal-cutting apparatus used for experimentally evaluating an embodiment of the invention.

We performed experimental tests of our controller using the arrangement depicted in FIG. 14. Boring bar 300 was secured in clamp 305, which was attached, in turn, to a lathe carriage (not shown) driven at a constant feedrate by a lathe motor. A ring clamp (not shown) fastened normal shaker 310 and tangential shaker 315 to the boring bar. At the end of the boring bar, as shown, we attached accelerometer 320 for measuring tangential bar motion, and accelerometer 325 for measuring normal bar motion. In this context, the normal direction is the direction normal to the surface of rotating workpiece 327 at the point of application of cutting tip 330, and the tangential direction is the direction tangential to the workpiece surface and parallel to the workpiece motion at the point of application of the cutting tip. It is apparent from FIG. 14 that a third direction, the axial direction (i.e., parallel to the longitudinal axis of the boring bar) may also be parallel to the workpiece surface. We did not make any effort to control deflections of the cutting tip in this axial direction, because any chatter that might be attributable to such deflections was far outweighed by normal chatter, or tangential chatter, or both. Axial control could readily be implemented in structures having a boring bar (or other important structural element) exhibiting significant axial compressibility.

Narrowband Chatter Test

The workpiece was made of Inconel 718. We have found that when cutting this or other nickel alloys (using a boring bar of symmetrical cross-section), narrowband chatter first emerges as a tangential deflection concentrated near the fundamental frequency of the boring bar and harmonics thereof, superimposed on the background cutting noise.

However, as the chatter grows, normal deflections (also concentrated at bar resonances) appear. Significantly, it is the normal chatter that more directly relates to the quality of the surface finish that is achievable. We found that controlling the tangential deflections can be effective for reducing first-mode chatter in the normal direction, thereby improving the resulting surface finish.

Our controller implemented the standard, reference-power normalized version of the FXLMS algorithm, updating the weights of the adaptive filter once each sample period. The reference signal was tapped from the output of the error sensor. (In this instance, the error sensor was the tangential accelerometer.)

Figure 15:
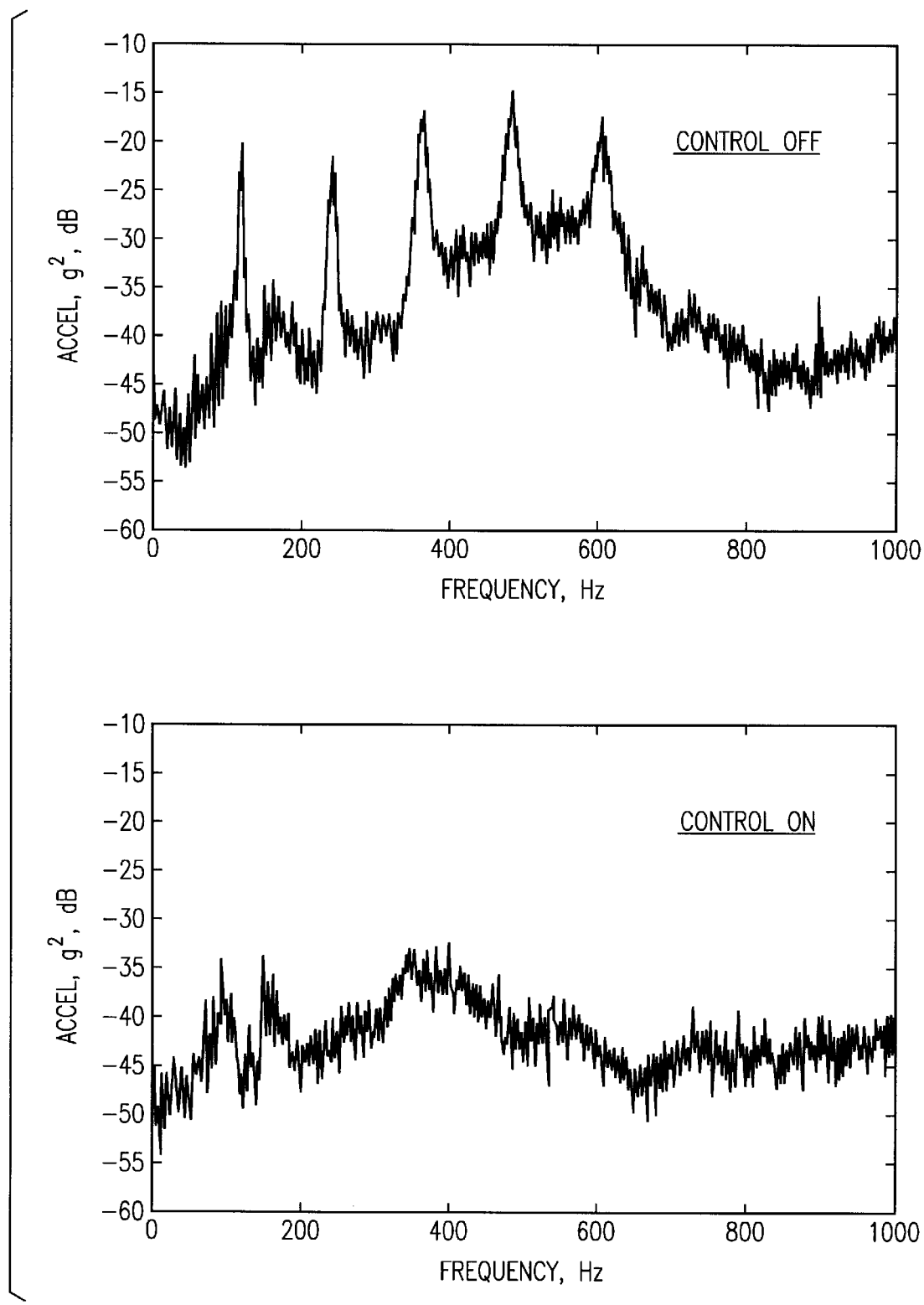
FIGS. 15 and 16 are frequency spectra of the magnitude of, respectively, normal chatter and tangential chatter measured on the apparatus of FIG. 14 under narrowband chatter conditions.

FIG. 15 is a frequency spectrum of normal chatter magnitude during the machining of 718 Inconel (Rockwell Hardness of 38) with the controller off and with the controller on. The workpiece rotates at 0.47 Hz, the depth of cut is 0.51 mm, and the feedrate is 0.25 mm per revolution. The boring bar is steel, with an overhang ratio of 10. Tangential acceleration is used as the error signal (without integration which would otherwise convert acceleration to, e.g., displacement). The adaptive filter length was 256 taps, representing a total time of 32 ms at a sample rate of 8 kHz. The fundamental chatter frequency, evident near 100 Hz, is the first mode frequency of the boring bar.

Figure 16:
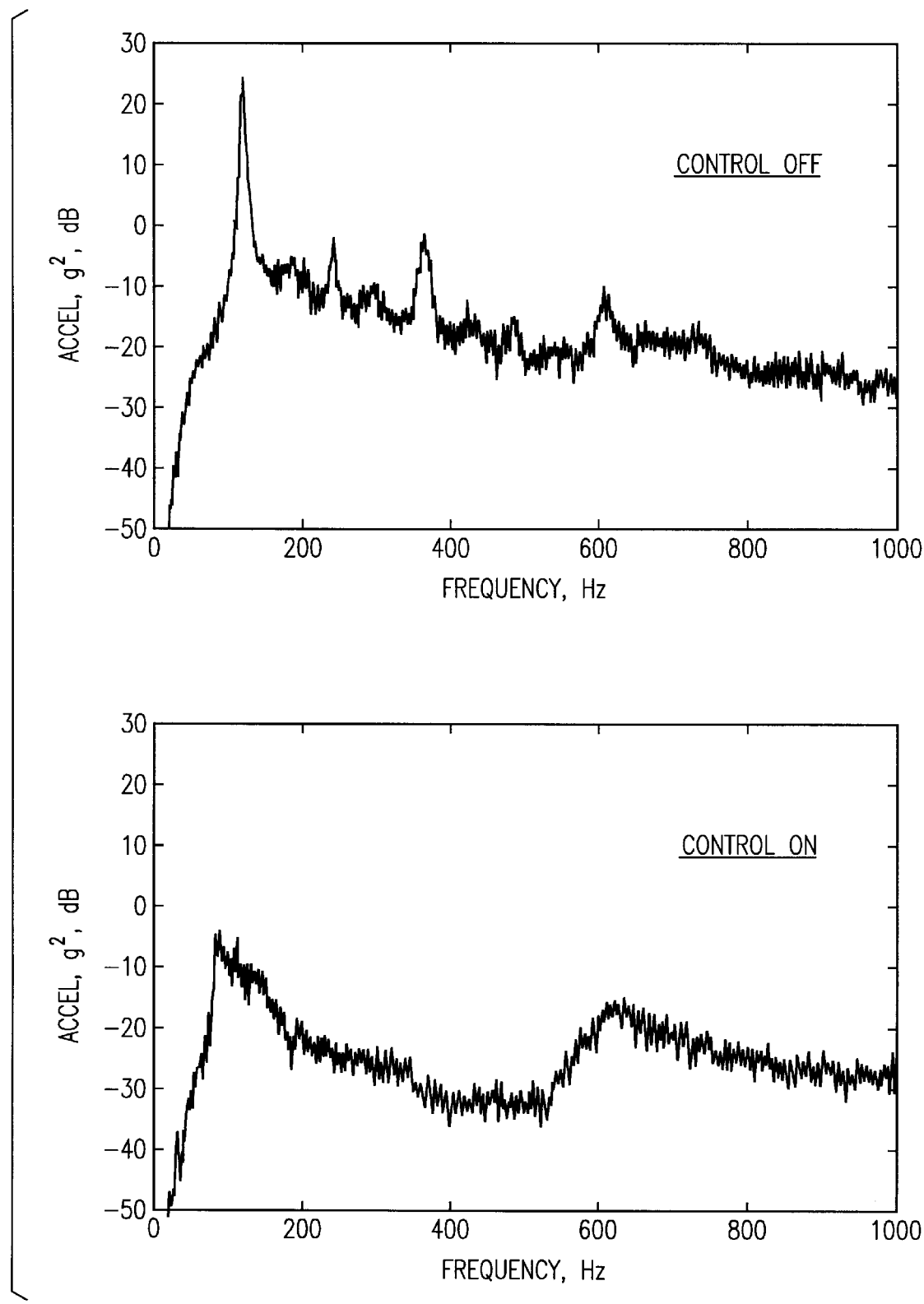

FIG. 16 is a frequency spectrum of the corresponding tangential chatter magnitude.

We found that as rotational velocity was increased still further, there emerged higher-order chatter, at higher resonant modes of the boring bar. We found it desirable, in suppressing chatter at higher than the fundamental mode, to control both normal and tangential deflections. We found it effective to use independent normal and tangential control loops, without cross-coupling between them. FIG. 5 helpfully illustrates our use of dual control loops, if, for example, error sensor $e_1$ is taken as the normal error sensor, error sensor $e_2$ is taken as the tangential error sensor, $e_1$ is connected only to Adaptive Filter 1, $e_2$ is connected only to Adaptive Filter 2, Actuator 1 is a normal actuator, and Actuator 2 is a tangential actuator.

Broadband Chatter Test

We found that in our tests, normal control was more effective than tangential control for reducing broadband chatter.

Figure 17:
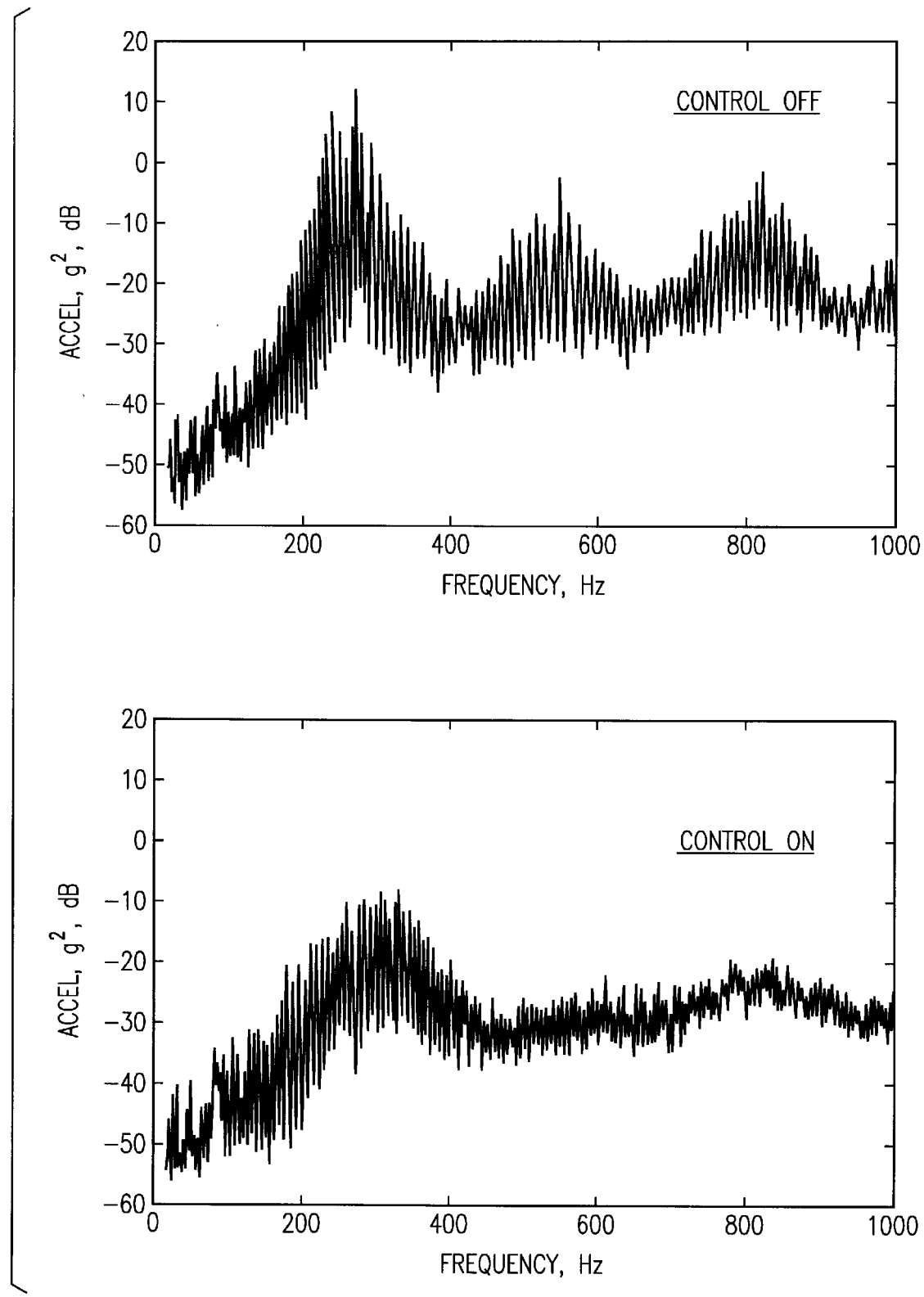
FIG. 17 is a frequency spectrum of the magnitude of normal chatter measured on the apparatus of FIG. 14 under broadband chatter conditions.

FIG. 17 is a frequency spectrum of normal chatter magnitude with the controller on and off during the cutting of 4140 steel. The workpiece rotates at 5.75 Hz, the depth of cut is 1 mm, and the feedrate is 0.125 mm per revolution. The adaptive filter length was 1024 taps, representing 256 ms at a sample rate of 4 kHz.

Inertial Actuator

Figure 18:
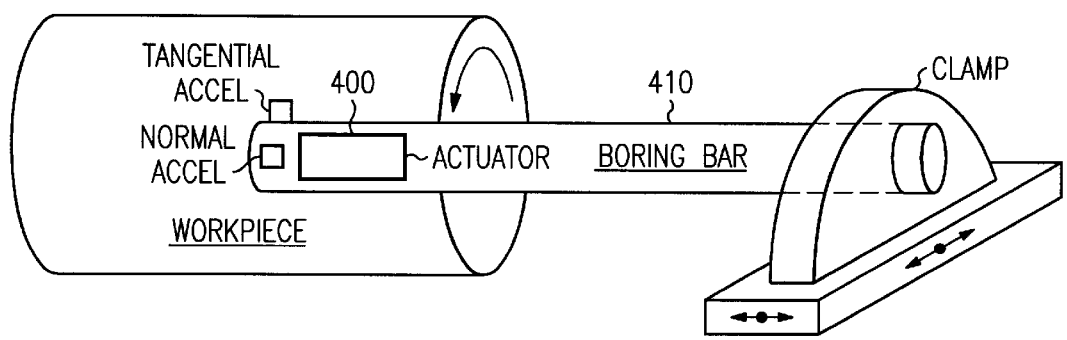
FIG. 18 is a schematic representation showing the alternative placement of a mechanical actuator within the boring bar of the metal-cutting apparatus of FIG. 14.

We achieved qualitatively similar results when an inertial actuator, contained within the boring bar, was used in place of the shaker (which is mounted external to the boring bar, as shown, e.g., in FIG. 14). The positioning of inertial actuator 400 within boring bar 410 is depicted in FIG. 18.

The invention claimed is:

1. A method for stabilizing at least one element of a mechanical system against echo-like responses to mechanical disturbances, comprising:

a) sensing the motion of the system at least at one point, thereby to provide at least one error signal;

b) providing at least one non-advanced reference signal directly related to some motion of the system;

c) operating an adaptive filter, thereby to produce a corrective signal that is responsive to the error and reference signals; and d) driving a mechanical actuator in response to the corrective signal, thereby to apply to the element a stabilizing generalized force derived from the corrective signal.

2. The method of claim 1, wherein the element is mechanically coupled to a rotating machine, and the step of operating the adaptive filter results in a corrective signal that exhibits a substantial correlation with the error signal at a delay, relative to the error signal, of approximately one rotational period of the machine.

3. The method of claim 1, wherein the element is mechanically coupled to a rotating workpiece, and the step of operating the adaptive filter results in a corrective signal that exhibits, a substantial correlation with the error signal at a delay, relative to the error signal, of approximately one rotational period of the workplace.

4. The method of claim 1, wherein the step of providing a non-advanced reference signal comprises tapping off a portion of the error signal.

5. The method of claim 1, wherein the element is mechanically coupled to a rotating machine, and the step of operating the adaptive filter results in a corrective signal that exhibits, relative to the reference signal, substantial spectral content at or near at least one structural resonant frequency of the mechanical system.

6. The method of claim 1, wherein the sensing step comprises sensing the motion of a toolpiece while it is cutting a rotating metal workpiece.

7. The method of claim 6, wherein the sensing step comprises sensing toolpiece motion in a direction normal to a surface portion of the workpiece where the workpiece is contacted by the toolpiece.

8. The method of claim 6, wherein the sensing step comprises sensing toolpiece motion in a direction tangential to a surface portion of the workpiece where the workpiece is contacted by the toolpiece.

9. The method of claim 6, wherein the actuator-driving step is carried out such that the corrective generalized force is applied directly from the actuator to the toolpiece.

10. The method of claim 6, wherein the actuator-driving step is carried out such that the corrective generalized force is transmitted from the actuator, through a structural support member, to the toolpiece.

11. The method of claim 10, comprising transmitting the corrective generalized force from the actuator, through a boring bar, to the toolpiece.

12. The method of claim 1, wherein the mechanical system is one of: a projection system, a space frame, a bridge, or a spacecraft antenna.

13. The method of claim 1, wherein the mechanical system comprises a machine, and the method is carried out during operation of the machine to modify a workpiece by at least one of: cutting, grinding, milling, and drilling.

14. The method of claim 1, wherein the mechanical system comprises a rotating propulsive engine.

15. A method for stabilizing one or more elements of a mechanical system against echo-like responses to mechanical disturbances, comprising:

a) sensing the motion of the system at least at two points, thereby to provide at least first and second error signals;

b) providing at least first and second reference signals, each said signal directly related to some motion of the system, each said signal non-advanced relative to a corresponding one of the error signals;

c) operating at least first and second adaptive filters, thereby to produce at least respective first and second corrective signals, each said corrective signal responsive to at least a corresponding one of said error signals and to a least a corresponding one of said reference signals; and d) driving each of at least first and second mechanical actuators in response to a corresponding one of said corrective signals, thereby to apply at least two stabilizing generalized forces to said one or more elements, each of said generalized forces derived from a corresponding one of said corrective signals.

16. The method of claim 15, wherein each of said first and second actuators applies a stabilizing generalized force to a distinct element of the mechanical system.

17. The method of claim 15, wherein each of said first and second actuators applies a stabilizing generalized force to the same element of the mechanical system, said stabilizing generalized forces having orthogonal directions.

18. The method of claim 15, wherein the providing step comprises tapping the first reference signal from the first error signal, and tapping the second reference signal from the second error signal.

19. A method for stabilizing a boring bar in a metal-cutting apparatus of the kind wherein the boring bar supports a cutting tip that is contactable to a rotating workpiece, and wherein a normal direction can be defined as the direction perpendicular to the workpiece surface at the point where the cutting tip contacts said surface, and a tangential direction can be defined as the direction parallel to the workpiece surface and to the direction of motion of the workpiece surface at said contact point, the method comprising:

a) sensing deflections of the boring bar, thereby to provide at least a first error signal and at least a first reference signal tapped from said error signal;

b) operating at least a first adaptive filter, thereby to produce at least a first corrective signal responsive to at least said first error signal; and c) driving at least a first mechanical actuator in response to said first corrective signal, thereby to apply a stabilizing generalized force, derived from said corrective signal, to said boring bar.

20. The method of claim 19, wherein:

the sensing step comprises sensing normal deflections of the boring bar, thereby to provide the first error signal, and sensing tangential deflections of the boring bar, thereby to provide a second error signal.

21. The method of claim 20, wherein:

the operating step comprises operating the first adaptive filter, thereby to produce a first corrective signal responsive to at least the first error signal, and operating a second adaptive filter, thereby to produce a second corrective signal responsive to at least the second error signal; and the driving step comprises driving the first actuator in response to the first corrective signal, thereby to apply a normally-directed generalized force to the boring bar, and driving a second actuator in response to the second corrective signal, thereby to apply a tangentially-directed generalized force to the boring bar.

22. The method of claim 21, wherein the first adaptive filter is operated such that the first corrective signal is responsive to the first but not the second error signal, and the second corrective signal is responsive to the second but not the first error signal.

23. Apparatus for stabilizing at least one element of a mechanical system against echo-like responses to mechanical disturbances, comprising:

a) at least one error sensor for providing an error signal that is indicative of the motion of the system at an error-sensing location;

b) means for providing at least one non-advanced reference signal directly related to some motion of the system;

c) at least one adaptive filter in receiving relationship to said error sensor and said reference-signal providing means; and d) at least one mechanical actuator, in receiving relationship to said adaptive filter, for applying to the element a stabilizing generalized force derived from a corrective signal received by said actuator from said adaptive filter.

24. Apparatus of claim 23, wherein the reference-signal providing means comprise a tap from the error sensor.

25. Apparatus of claim 24, wherein the mechanical system comprises a rotating machine having a rotational period, and the reference-signal providing means further comprise a delay element for delaying the signal tapped from the error sensor by approximately one said period.

26. Apparatus of claim 24, wherein the element is mechanically couplable to a rotating workpiece having a rotational period, and the reference-signal providing means further comprise a delay element for delaying the signal tapped from the error sensor by approximately one said period.

27. Apparatus of claim 23, wherein the reference-signal providing means comprise a reference sensor for providing an indication of mechanical signals propagating in the system, said reference sensor situated such that it will respond to said mechanical signals after the error sensor responds to said signals.

28. Apparatus as recited, in claim 23, wherein the mechanical system comprises a rotating machine, at least one actuator is mounted on a portion of the rotating machine, and the rotating machine is of the kind that performs at least one operation from the group consisting of: cutting, grinding, milling, and drilling.

29. Apparatus for stabilizing one or more elements of a mechanical system against echo-like responses to mechanical disturbances, comprising:

a) at least two error sensors for providing error signals that are indicative of the motion of the system at respective error-sensing-locations;

b) means for providing at least two reference signals directly related to some motions of the system, each said reference signal non-advanced relative to at least a respective one of said error signals;

c) at least two adaptive filters, each in receiving relationship to at least a respective one of said error sensors and to at least a respective one of said reference-signal providing means; and d) at least two mechanical actuators, each in receiving relationship to a respective one of said adaptive filters, each said actuator configured to apply to an element of the system a stabilizing generalized force derived from a corrective signal received by said actuator from its respective adaptive filter.

30. Apparatus of claim 29, wherein each actuator is configured to apply a stabilizing generalized force to a distinct element.

31. Apparatus of claim 29, comprising at least first and second actuators, and said first and second actuators are configured to apply mutually orthogonal stabilizing generalized forces to the same element.

32. Apparatus of claim 29, comprising at least first and second adaptive filters, wherein:

said first actuator is in receiving relationship to said first adaptive filter;

said second actuator is in receiving relationship to said second adaptive filter, said first adaptive filter is in receiving relationship to said first error sensor but not to said second error sensor; and said second adaptive filter is in receiving relationship to said second error sensor but not to said first error sensor.

33. Apparatus of claim 29, wherein each said reference-signal providing means comprises a tap from a respective one of said error sensors.

34. Apparatus for subtractively shaping a rotating workpiece, comprising:

a) a boring bar for supporting a cutting tip and holding said tip against the workpiece;

b) at least one error sensor for sensing motions of the boring bar, c) means in receiving relationship to the error sensor for providing a reference signal;

d) at least one adaptive filter in receiving relationship to said error sensor and said reference-signal providing means; and e) at least one mechanical actuator, in receiving relationship to said adaptive filter, for applying to the boring bar a stabilizing generalized force derived from a corrective signal received by said actuator from said adaptive filter.

35. Apparatus of claim 34, wherein the reference-signal providing means comprise a tap for tapping a signal from the error sensor, followed by a delay element for delaying the tapped signal by approximately one rotational period of the workpiece.

36. Apparatus for subtractively shaping a rotating workpiece by applying a cutting tip to a surface of said workpiece, wherein a normal direction is defined as the direction perpendicular to the workpiece surface at the point where the cutting tip contacts said surface, and a tangential direction is defined as the direction parallel to the workpiece surface and to the direction of motion of said surface at said contact point, the apparatus comprising:

a) a boring bar for supporting the cutting tip and holding said tip against the workpiece;

b) at least a first error sensor for sensing normally-directed motions of the boring bar and a second error sensor for sensing tangentially-directed motions of the boring bar;

c) at least first and second means, in respective receiving relationship to the first and second error sensors, for providing respective first and second reference signals;

d) at least a first adaptive filter in receiving relationship to said first error sensor and said first reference-signal providing means, and a second adaptive filter in receiving relationship to said second error sensor and said second reference-signal providing means; and e) a first mechanical actuator in receiving relationship to said first adaptive filter, conformed to apply to the boring bar a normally-directed stabilizing generalized force derived from a corrective signal received by said first actuator from said first adaptive filter; and f) a second mechanical actuator in receiving relationship to said second adaptive filter, conformed to apply to the boring bar a tangentially-directed stabilizing generalized force derived from a corrective signal received by said second actuator from said second adaptive filter.

* * * * *

UNITED STATES PATENT AND TRADEMARK OFFICE
CERTIFICATE OF CORRECTION

PATENT NO. : 5,816,122
DATED : October 6, 1998
INVENTOR(S) : Benning et al.

It is certified that error appears in the above-indentified patent and that said Letters Patent is hereby corrected as shown below:

| | |
|---|---|
| Col. 2, Line 8 | "MCI" should be -- MCT --. |
| Col. 2, Line 37 | "active on control" should be -- active vibration control --. |
| Col. 2, Line 42 | "signals the same" should be -- signals are the same --. |
| Col. 2, Line 64 | "bar and" should be -- bar, and --. |
| Col. 3, Line 4 | "is idealized" should be -- is an idealized --. |
| Col. 3, Line 14 | "$F_a(s)$" should be -- $F_a(s)$ --. The "a" should not be in italics. |
| Col. 3, Line 49-50 | "transversal filter" should be -- *transversal filter* --. |
| Col. 4, Line 1 | "noise n" should be -- noise $n$ --. |
| Col. 4, Line 2 | "signal e" should be -- signal $e$ --. |
| Col. 4, Line 5 | "signal e" should be -- signal $e$ --. |
| Col. 4, Line 7 | "response d" should be -- response $d$ --. |

UNITED STATES PATENT AND TRADEMARK OFFICE
CERTIFICATE OF CORRECTION

PATENT NO. : 5,816,122
DATED : October 6, 1998
INVENTOR(S) : Benning et al.

It is certified that error appears in the above-indentified patent and that said Letters Patent is hereby corrected as shown below:

| | |
|---|---|
| Col. 4, Line 8 | "response y" should be -- response $y$ --. |
| Col. 4, Line 8 | "e=d-y" should be -- $e=d-y$ --. |
| Col. 4, Line 9 | "responses d and y" should be -- responses $d$ and $y$ --. |
| Col. 4, Line 26 | "before" should be -- *before* --. |
| Col. 4, Line 57 | "signal e" should be -- signal $e$ --. |
| Col. 4, Line 57 | "signal x" should be -- signal $x$ --. |
| Col. 4, Line 67 | "stabilized" should be -- stabilized. --. |
| Col. 5, Line 18 | "A(s)e$^{T(s)}$" should be -- A(s)e$^{sT(s)}$ --. |
| Col. 5, Line 22 | "$\mu$e$^{-sT}$" should be -- $\mu$e$^{-sT}$ --. |
| Col. 5, Line 44 | "A(s)e$^{T(s)}$" should be -- A(s)e$^{sT(s)}$ --. |
| Col. 5, Line 47 | "stable" should be -- *stable* --. |
| Col. 5, Line 49 | "unstable" should be -- *unstable* --. |

UNITED STATES PATENT AND TRADEMARK OFFICE
CERTIFICATE OF CORRECTION

PATENT NO.  : 5,816,122
DATED       : October 6, 1998
INVENTOR(S) : Benning et al.

Page 3 of 5

It is certified that error appears in the above-indentified patent and that said Letters Patent is hereby corrected as shown below:

| | |
|---|---|
| Col. 5, Line 51 | "noise n" should be -- noise $n$ --. |
| Col. 5, Line 51 | "response d" should be -- response $d$ --. |
| Col. 5, Line 57 | "unstable" should be -- *unstable* --. |
| Col. 5, Line 58 | "response d" should be -- response $d$ --. |
| Col. 5, Line 58 | "unstable" should be -- *unstable* --. |
| Col. 6, Line 15 | "any" should be -- *any* --. |
| Col. 6, Line 53 | "$BW_{con}$" should be -- $BW_{con}$ --. |
| Col. 6, Line 57 | "$T_{DEL}$" should be -- $T_{DEL}$ --. |
| Col. 6, Line 58 | "$T_{RES}$" should be -- $T_{RES}$ --. |
| Col. 6, Line 59 | "$T_{DEL}$" and "$T_{RES}$" should be -- $T_{DEL}$ -- and -- $T_{REV}$ --. |
| Col. 6, Line 63 | "$T_{REV}$" should be -- $T_{REV}$ --. |
| Col. 6, Line 65 | "$T_{DEL}$" and "$T_{REV}$" should be -- $T_{DEL}$ -- and -- $T_{REV}$ --. |

UNITED STATES PATENT AND TRADEMARK OFFICE
CERTIFICATE OF CORRECTION

PATENT NO. : 5,816,122
DATED : October 6, 1998
INVENTOR(S) : Benning et al.

It is certified that error appears in the above-indentified patent and that said Letters Patent is hereby corrected as shown below:

| | |
|---|---|
| Col. 7, Line 2 | "$T_{REV}$" and "$T_{RES}$" should be -- $T_{REV}$ -- and -- $T_{RES}$ --. |
| Col. 7, Line 65 | "$\mu_m$" should be -- $\mu_m$ --. |
| Col. 8, Line 3 | "$Y_d$" should be -- $Y_d$ --. |
| Col. 8, Line 7 | "$\mu M$" should be -- $\mu_m$ --. |
| Col. 8, Line 7 | "$e^{-sT}$" should be -- $e^{-sT}$ --. |
| Col. 8, Line 8 | "$F_c(s)$" should be -- $F_c(s)$ --. |
| Col. 8, Line 11 | "$K_c$" should be -- $K_c$ --. The "c" should not be italics. |
| Col. 9, Line 11 | "collection" should be -- *collection* --. |
| Col. 9, Line 24 | "inter alia" should be -- *inter alia* --. |
| Col. 11, Line 27 | "$F_a(s)$" should be -- $F_a(s)$ --. |
| Col. 11, Line 39 | "$y_a(s)$" should be -- $y_a(s)$ --. |
| Col. 11, Line 42 | "$y_c(s)$" should be -- $y_c(s)$ --. |

UNITED STATES PATENT AND TRADEMARK OFFICE
CERTIFICATE OF CORRECTION

PATENT NO. : 5,816,122
DATED : October 6, 1998
INVENTOR(S) : Benning et al.

It is certified that error appears in the above-indentified patent and that said Letters Patent is hereby corrected as shown below:

Col. 12, Line 43, 55           Equation should not be in italics.

Col. 13, Line 8, 9           Equation should not be in italics.

Signed and Sealed this

Thirty-first Day of August, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,816,122
DATED : October 6, 1998
INVENTOR(S) : Benning et al.

It is certified that error appears in the above-indentified patent and that said Letters Patent is hereby corrected as shown below:

Col. 1, Line 8      Delete "Contract F33615-94-C-2033" and insert
--Contract F33615-94-C-4440--

Signed and Sealed this

Twenty-eighth Day of November, 2000

Attest:

Q. TODD DICKINSON

*Attesting Officer*      *Director of Patents and Trademarks*